(12) United States Patent
Hirano et al.

(10) Patent No.: US 8,098,642 B2
(45) Date of Patent: Jan. 17, 2012

(54) COMMUNICATION SYSTEM AND MOBILE HOME AGENT

(75) Inventors: Jun Hirano, Kanagawa (JP); Mohana Dhamayanthi Jeyatharan, Singapore (SG); Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 626 days.

(21) Appl. No.: 12/306,906

(22) PCT Filed: Jul. 3, 2007

(86) PCT No.: PCT/JP2007/063628
§ 371 (c)(1),
(2), (4) Date: Dec. 29, 2008

(87) PCT Pub. No.: WO2008/004688
PCT Pub. Date: Jan. 10, 2008

(65) Prior Publication Data
US 2009/0190564 A1 Jul. 30, 2009

(30) Foreign Application Priority Data
Jul. 4, 2006 (JP) ................................ 2006-184877

(51) Int. Cl.
*H04W 4/00* (2009.01)
(52) U.S. Cl. ....................................................... 370/338
(58) Field of Classification Search .................. 370/338
See application file for complete search history.

(56) References Cited

U.S. PATENT DOCUMENTS

| 6,636,498 | B1 | 10/2003 | Leung |
| 6,915,325 | B1 * | 7/2005 | Lee et al. ................. 709/202 |
| 7,298,743 | B2 * | 11/2007 | Markki et al. .............. 370/392 |
| 2007/0223410 | A1 * | 9/2007 | Oyama et al. ............... 370/310 |

FOREIGN PATENT DOCUMENTS

| EP | 1 134 991 | 6/2004 |
| GB | 2 419 778 | 5/2006 |

OTHER PUBLICATIONS

International Search Report dated Jan. 30, 2008.
D. Johnson, et al., "Mobility Support in IPv6," Network Working Group, RFC3775, Standards Track, Jun. 2004, pp. 1-165.

(Continued)

*Primary Examiner* — Kenny Lin
(74) *Attorney, Agent, or Firm* — Dickinson Wright PLLC

(57) ABSTRACT

A technique is disclosed to decrease unnecessary routing during communication between a mobile node and a correspondent node in case a home agent of the mobile node is a mobile home agent. According to this technique, HA 112 positioned in a home network 102 and HA 114 of MN 130 are included. In a communication system, where HA 114 is a mobile home agent, and a mobile network 104 of HA 114 is hierarchized under the home network 102, HA 114, which is a home agent, discovers HA 112 positioned in the home network 102 when it is detected that it is away from the home network 102 and delegates binding cache entry of MN 130 under its own management to HA 112 so that HA 112 acts as a home agent for MN 130.

10 Claims, 14 Drawing Sheets

OTHER PUBLICATIONS

V. Devarapalli, et al., "Network Mobility (NEMO) Basic Support Protocol," Network Working Group, RFC3963, Standards Track, Jan. 2005, pp. 1-33.

J. Jue, et al., "Design and Analysis of replicated Servers to Support IP-Host Mobility in Enterprise Networks," IEEE International Conference on Communications, Session 35.1, Jun. 8-12, 1997, pp. 1256-1260.

V. Devarapalli, et al., "Local HA to HA protocol," draft-devarpalli-mip6-nemo-local-haha-00, MIP6/NEMO Working Group, Internet Draft, Jul. 1, 2005, pp. 1-10.

R. Wakikawa, et al., Inter Home Agents Protocol (HAHA), draft-wakikawa-mip6-nemo-haha-01.txt, MIP6/NEMO Working Group, Internet Draft, Standards Track, Feb. 16, 2004, pp. 1-39.

P. Thubert, er al., "Global HA to HA protocol," draft-thubert-nemo-global-haha-01, Network Mobility, Internet Draft, Oct. 15, 2005, pp. 1-24.

T. Ernst, et al., "Multihoming with NEMO Basic support," International Conference on Mobile Computing and Ubiquitous Networking, 2004, pp. 1-6.

\* cited by examiner

COMMUNICATION SYSTEM AND MOBILE HOME AGENT

TECHNICAL FIELD

The present invention relates to the field of communication in packet exchange data communication network. In particular, the invention relates to packet routing of a mobile node with a mobile home agent.

Further, the invention relates to a communication system, which comprises a first home agent positioned in a home domain and a second home agent of a mobile node, said second home agent being a mobile home agent, and a mobile network of said mobile home agent is hierarchized under said home domain, and the invention also relates to a mobile home agent in said communication system.

BACKGROUND ART

In recent years, it has been practiced to perform communication between many apparatuses by using Internet Protocol (IP). Also, "Mobility Support in IPv6 (MIPv6)" has been developed by the Internet Engineering Task Force (IETF) to provide mobility support for the mobile apparatuses (See the Non-Patent Document 1 given below). In MIPv6, each mobile node has permanent home domain. When a mobile node is connected to a home network, a primary global address called "home address" (HoA) is assigned. When a mobile node is away from the home network, i.e. when it is connected to other external network, a temporary global address known as "care of address" (CoA) is assigned. In the concept of the mobility support, even when a mobile node is connected to other external network, a packet addressed to the mobile node can reach its home address. This is accomplished when an entity known as a home agent (HA) is introduced in the home network as described in the Non-Patent Document 1.

A mobile node registers its care of address by using a message, which is known as Binding Update (BU) message, to a home agent. As a result, the home agent can generate the association to associate the home address of the mobile node with the care of address. The home agent intercepts the message of the mobile node to the home address and has responsibility to transfer the packet to the care of address of the mobile node by encapsulating the packet (this is known as packet tunneling) (i.e. to place the packet on a payload of a new packet).

With the propagation and the increase of wireless apparatuses, it can be predicted that new classes of mobility technique would appear. Among such techniques, total network of the node changes the points of connection in the network mobility (NEMO). If the concept of the mobility support for individual hosts is extended to the mobility support of the network of nodes, the objective is to offer a mechanism, such that the node in the mobile network can be located and connected to any segment in the Internet and can be reached by primary global address.

As disclosed in the Non-Patent Document 2 and the Patent Document 1 as given below, IETF has developed a solution for network mobility. In these documents, it is described that network prefix used by the node in mobile network is given within BU when a mobile router (MR) transmits BU to a home agent. Also, it is described that it is inserted into BU by using a specific option known as Network Prefix Option. In doing so, the home agent builds up a routing table based on prefix, and it is possible to transfer the packet transmitted to the destination having these prefixes based on the table to the care of address of the mobile router.

In the Non-Patent Document 1, discussion is made on global mobility support for the mobile node, and a full route optimization (RO) is disclosed, which uses the procedure of return routability (RR) between a mobile node and a correspondent node (CN). In the Non-Patent Document 2, discussion is made on network mobility support, which gives no specific consideration on route optimization. In both of these documents, no serious consideration is given on home network model for the mobile node. In normal assumption, a home agent is a fixed router in a home sub-network. Even when the home agent may be mobile, the techniques described in the Non-Patent Documents 1 and 2 can merely support peer-to-peer packet transmission. However, there are some inconveniences as to be described below.

There are several methods to build up home network for mobile node including the arrangement of mobile home network. As a conceivable example of such arrangement, there is a case where the home network, to which the mobile node is connected, is movable, and the mobile router of this mobile home network has its own fixed home agent (known as root HA). The model of such home network model is possible in case the home agent of the mobile node is also a mobile router or in case the home agent of the mobile node is connected to a mobile network behind the mobile router.

Description will be given on one example where such case occurs. A root HA can be arranged at "corporate headquarters". A mobile home network, which uses this root HA as a default router can be assigned to "Sales Dept.", which moves from a local office to another local office. Also, the mobile node using the root HA connected to this mobile home network is maintained by the staffs of the Sales Dept. As another example of arrangement, the case of fire department or police station can be conceived. In this case, the root HA may be assigned to "Regional Headquarters". This mobile HA is maintained by a mobile patrol car, for instance, and the mobile node using this mobile home network is maintained by fire department staffs or by policemen.

Quasi-optimization of the route occurs when MIPv6 and NEMO basic supports become effective regardless of whether the mobile HA is positioned together with the mobile router or it is positioned behind the mobile router. Description will be given below. FIG. 13 gives an example of problem, in which quasi-optimization of route occurs when the position of HA is changed. In this arrangement example, a mobile node (MN) 130 currently connected to an external access router (AR) 148 has a home network (mobile network) 104 and the mobile network 104 is also moved from the initial position (home network 102). HA 114 in the home network 104 is a home agent of MN 130, and it is connected to MR 124, which is a default router. The home network of MR 124 is a home network 102. The root HA, i.e. the home agent of MR 124, is HA 112 in the home network 102. In the arrangement example, the home network 102 of MR 124 is fixed. When MN 130 and CN 150 want to perform data communication, the data communication between these peer nodes would be carried out via a global communication network 100 (e.g. Internet).

FIG. 14 shows data communication path between MN 130 and CN 150 when MIPv6 and NEMO basic supports are used at the mobile node and the mobile router. If it is assumed that route optimization cannot be achieved by MN 130 and CN 150, the data path will be as given below. MN 130 tunnelizes a data packet addressed to HA 114. In this case, MR 124 is away from home, and HA 112 would have prefix of mobile network 104 in the binding cache entry (BCE). Therefore, the tunnelized data packet to be sent to HA 114 passes through a path 160 and is intercepted by HA 112. The reason is that HA 112 discovers the concurrence of the longest prefix as the address of HA 114 in BCE. HA 112 further encapsulates this packet and tunnelizes it via a path 162 to transmit it to MR 124.

When this packet is received, MR 124 decapsulates it and delivers the inner packet to HA 114. HA 114 further decapsulates this packet and tries to transfer it to its destination CN 150. This data packet passes through MR 124, which is a default router. Using NEMO basic support, MR 124 tunnelizes this packet via a path 163 and sends it to HA 112. When this packet is received, HA 112 decapsulates it and transfers the packet inside, which is destined to CN 150, via a path 164 to CN 150.

Therefore, when basic standardized protocols are used by the mobility pattern, it is evident that the data path between the mobile node and CN makes a long detour. Even when route optimization can be achieved between two peer entities, RR (Return Routability) relating to signaling using the home agent is to be turned to an inefficient path by the moving.

The Non-Patent Document 3 describes a method to transfer from a home agent to another home agent for the purpose of load balancing in MIPv6. This method is primarily processed at the home agent. That is, the load between a plurality of home agents is balanced on home link according to the number of packets to be tunnelized. This equilibration or balancing of the load is achieved by a plurality of server home agents having replicated data rather than the partitioned server home agent. The method of the partitioned server home agent is used in normal MIPv6. Here, the home link of the mobile node has a multiple of home agents, and the mobile node selects one home agent according to the number of the advertised and desirable home agents. The home agent can realize static load balancing by changing the desirable level when transmitting a router advertisement (RA) message.

In the method based on duplication, the mobile node selects the home agent at random when it wants to start registration, but the home agent under the control is not fixed during the period when registration remains effective. When the new registration is received, the home agent sends binding information to all home agents in the home link. After a certain time has elapsed or after several packets of threshold value, the control is given to another adequate home agent. The new home agent controls the packet addressed to the mobile node in BCE and acts as a proxy for a mobile host. According to this method, therefore, the purpose when BCE is shifted from the home agent to another home agent is basically for load balancing. Also, the mobile host recognizes this shifting of BCE.

The Non-Patent Document 4 given below proposes a protocol to perform balancing of the load between the home agents in the home link and to switch over to a new home agent by detecting failure of the home agent. This protocol does not depend on RA to prepare a list of home agents but uses hello message in the home link for the preparation of the list of home agents. Each mobile node or each mobile router carries out Dynamic Home Agent Discovery (DHAAD) and discovers an adequate home agent. This home agent is called "primary home agent". After the mobile node registers the binding to this primary home agent, the primary home agent sends the binding cache entry to another home agent in the home link. This is used for the purpose of balancing the load so that any home agent of the home link can send a proxy message for prefix of mobile node and the data packet can be tunnelized to the current care of address of the mobile node.

In addition, when failure occurs in the primary home agent, or for the purpose of balancing the load, the switching of the primary home agent is carried out by a backup node. At the time of failure, the backup node sends a request for switching, or the primary home agent sends a request for switching to the mobile node for load balancing. This method is used for the load balancing and for the discovery of the failure and it is not for route optimization by the mobile home agent.

In the Non-Patent Document 5, distributed (decentralized) home network model is used for three purposes, i.e. redundancy of the home agent, load sharing between the home agents, and route optimization. This method is particularly useful for route optimization of NEMO. According to this method, one primary home agent is selected from the distributed home network. The distributed home agents have the same anycast address. By the anycast message, the closest home agent is selected as the primary home agent.

In this protocol also, a home agent BCE delegation mechanism similar to the one described in the Non-Patent Document 4 is used. According to this method, the mobile router can obtain a new home agent in the neighborhood by executing DHAAD when it is moved to a new link, and it is particularly useful for solving the problem of a moving home agent. However, the problem lies in that this solution is for the distributed home network mode. On the other hand, the solution according to the present invention is not for the distributed home network model. In this case, there are a multiple of signalings such as hello message between home agents or binding synchronization message. Further, when the home agent in the home domain moves, the correspondent closer to the home domain cannot send the data to the mobile node by finding an adequate home agent in the home domain. Therefore, it is better that the home agent in the home domain has always BCE of the mobile node. Also, according to this method, when the home agent moves, BCE of all home agents belonging to the distributed home network must be updated, and this makes the matter very complicated. Accordingly, if possible, it is better to find a home agent, which is in rest position.

In the Non-Patent Document 6, discussion is made on a method similar to that of the Non-Patent Document 5 except the following point: In the Non-Patent Document 6, a proxy MIP is introduced for local mobility management and for route optimization. In addition, distributed home network model is used. In the distributed home network, the home agents exchange BCE with each other when they are away from the home network, and all home agents belonging to different home network models maintain the tunnel between the home agents. The tunnel can be maintained by a certain routing protocol. This method is a method to reinforce the Non-Patent Document 5, and route optimization can be accomplished during the MR-to-MR communication.

According to the Patent Document 2, delegation of BCE from home agent to home agent is given for the reason of load balancing, and there are one primary home agent and several secondary home agents. When the load on the primary home agent is increased, the primary agent delegates transmission right to the secondary home agent in transmissive (transparent) manner so that the mobile node does not become aware of it. However, the primary home agent is still controlling the mobile node, and all binding messages are transmitted and processed by the primary home agent. The secondary home agent merely acts as a proxy for the mobile node or for the mobile router and intercepts the packet addressed to the mobile node. Further, when a packet to be sent to the mobile network node (MNN) attached to a MR, or a mobile node, is tunnelized, the secondary home agent uses the address of the primary home agent as source address of the tunnel.

[Patent Document 1] Leung, K. K., "Mobile IP mobile router", U.S. Pat. No. 6,636,498, October 2003.

[Patent Document 2] Haverinen, Henry, "Load balancing in telecommunications system supporting mobile IP", EP 1 134991 B1, 23 Jun. 2004.

[Non-Patent Document 1] Johnson, D. B., Perkins, C. E., and Arkko, J., "Mobility Support in IPv6", Internet Engineering Task Force (IETF) Request For Comments (RFC) 3775, June 2004.

[Non-Patent Document 2] Devarapalli, V., et. al., "NEMO Basic Support Protocol", Internet Engineering Task Force (IETF) Request For Comments (RFC) 3963, January 2005.

[Non-Patent Document 3] Jason P. Jue and Dipak Ghosal, "Design and Analysis of replicated Servers to Support IP-Host Mobility in Enterprise Networks", Communications, 1997, pgs 1256-1260.

[Non-Patent Document 4] Devarapalli, V., Wakikawa, R., and Thubert, P., "Local HA to HA protocol", IETF Internet Draft: draft-devarapalli-mip6-nemo-local-haha-00.txt, Work-In-Progress, Jan. 2, 2006.

[Non-Patent Document 5] Wakikawa, R., Devarapalli, V., and Thubert, P., "Inter Home Agents Protocol (HAHA)", IETF Internet Draft: draft-wakikawa-mip6-nemo-haha-01.txt, 16 Feb. 2004.

[Non-Patent Document 6] Thubert, P., Wakikawa, R., and Devarapalli, V., "Global HA to HA protocol", IETF Internet Draft: draft-thubert-nemo-global-haha-01.txt, expires Apr. 18, 2006.

When discussion is made on the prior art as given above, it is apparent that many solutions have been proposed for load balancing under home link or distributed home link environment. However, none of the prior art gives consideration on the state where home agent moves, i.e. the state where the home agent is positioned in mobile network. Accordingly, problems of inefficient routing may occur for the mobile node in the mobility as described above.

DISCLOSURE OF THE INVENTION

It is an object of the present invention to improve the problems and the defects of the prior art as given above. In particular, it is another object of the invention to provide a communication system and a mobile home agent, by which it is possible to reduce unnecessary routing in the communication between a mobile node and a correspondent node in case the home agent of a mobile node is a mobile home agent.

To attain the above objects, the present invention provides a communication system, which comprises a first home agent positioned in a home domain and a second home agent of a mobile node, said second home agent being a mobile home agent, and a mobile network of said mobile home agent is hierarchized under said home domain, wherein said mobile home agent comprises the steps of:

detecting whether the mobile home agent itself is away from said home domain;

discovering said first home agent in case it is detected that the mobile home agent is away from said home domain; and delegating binding cache entry of said mobile node under management to said first home agent so that said first home agent acts as a home agent for said mobile node.

Also, the present invention provides a mobile home agent in a communication system, which comprises a first home agent positioned in a home domain and a second home agent of a mobile node, said second home agent being a mobile home agent, and a mobile network of said mobile home agent is hierarchized under said home domain, wherein said mobile home agent comprises the steps of:

detecting whether the mobile home agent itself is away from said home domain or not;

discovering said first home agent when it is detected that the first home agent is away from said home domain; and delegating binding cache entry of said mobile node under the management to said first home agent so that said first home agent acts as a home agent for said mobile node.

With the arrangement as described above, a home agent in a home domain accepts delegated rights so that it acts as a home agent for the mobile node when the mobile home agent, acting as a home agent of the mobile node, is away from the home domain. As a result, the path between the mobile node and the correspondent node does not go via the mobile home agent, and unnecessary routing can be reduced.

Also, the present invention provides the mobile home agent as described above, wherein said mobile home agent further comprises a step of continuing execution of neighbor discovery proxy of said mobile node after delegating the binding cache entry of said mobile node to said first home agent, and intercepting a packet addressed to said mobile node and transferring said packet to said first home agent.

Further, the present invention provides the mobile home agent as described above, wherein said mobile home agent further comprises a step of detecting that said mobile node has returned to said home domain, and collecting binding cache entry delegated to said first home agent.

Also, the present invention provides the mobile home agent as described above, wherein said mobile home agent further comprises a step of detecting that said mobile node has returned to its own home, from which it has been away during the period when it is not positioned in said home domain, and notifying said first home agent that binding cache entry of said mobile node should be deleted.

Further, the present invention provides the communication system as described above, wherein:

for the purpose of transmissively carrying out the delegation of said binding cache entry of said mobile node;

said binding cache entry is transferred to said first home agent from said mobile home agent, and said first home agent maintains said binding cache entry transferred by said first home agent; and said first home agent acts as a proxy home agent of said mobile node of said binding cache entry maintained by said first home agent, said first home agent intercepts a packet addressed to said mobile node and turns the packet to tunnel by using source address of the tunnel packet as address of said mobile home agent.

Further, the present invention provides the communication system as described above, wherein:

for the purpose of non-transmissively carrying out the delegation of said binding cache entry of said mobile node;

said mobile home agent transmits a binding cache entry delegation message including a security token newly generated to said first home agent and notifies said first home agent to said mobile node; and upon receipt of notification of said first home agent, said mobile node transmits a new binding cache update message to said first home agent.

According to the present invention, it is possible to reduce unnecessary routing in the communication between a mobile node and a correspondent node when a home agent of a mobile node is a mobile home agent.

BEST MODE FOR CARRYING OUT THE INVENTION

Figure 1:
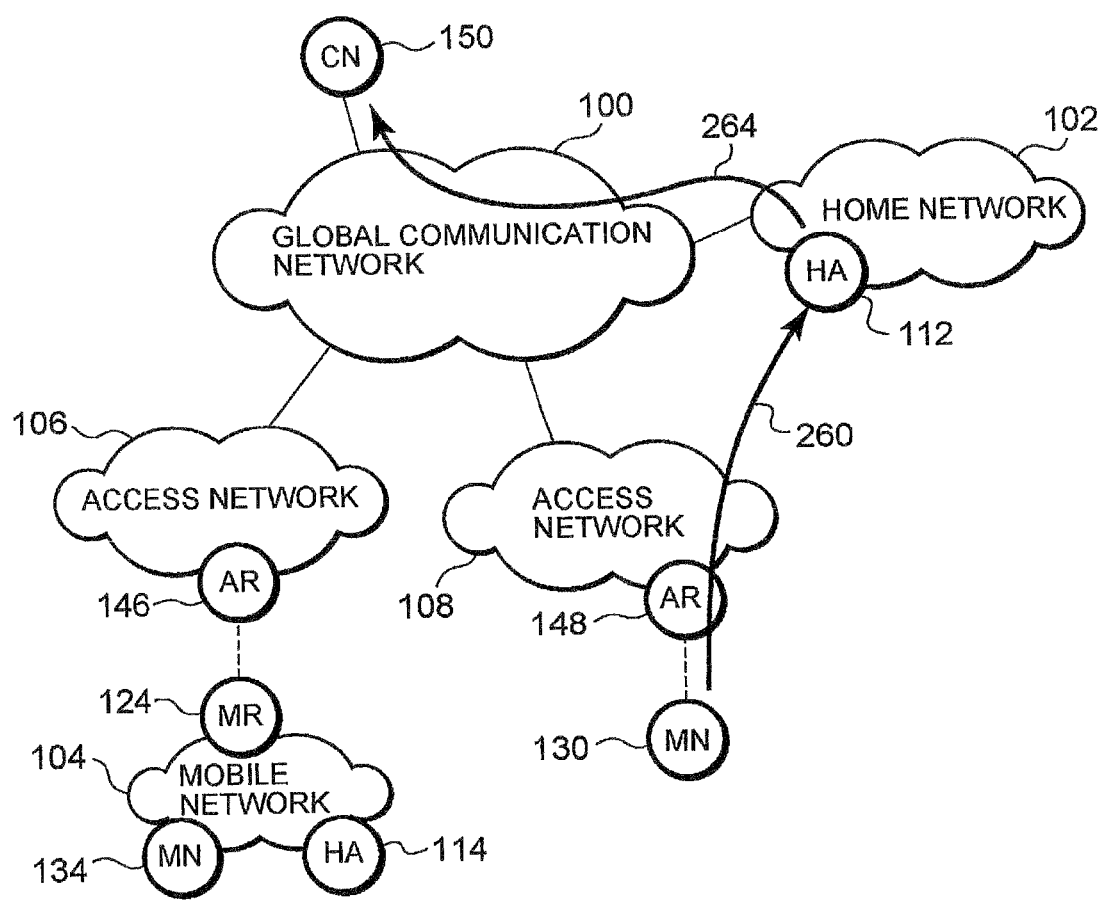
FIG. 1 is a drawing to explain a data packet routing path in a preferred first embodiment of the present invention.

Description will be given below on embodiments of the present invention by referring to the attached drawings. In FIG. 1, the communication system according to the present invention comprises HA 112 (a first home agent) positioned in a home domain (home network 102) and HA 114 (a second home agent) of MN 130 and MN 134. HA 114 is a mobile home agent, and the mobile network 104 of HA 114 is hierarchized under the home network 102. Also, in FIG. 1, the home network 102 is connected to a global communication network 100. CN 150 and access networks 106 and 108 are connected to the global communication network 100. MR 124 of the mobile network 104 is away from the home network 102, which is its home network, and is connected to AR 146 of the access network 106. MN 130 is away from the mobile network 104, which is its home network, and it is connected to AR 148 of the access network 108.

Figure 14:
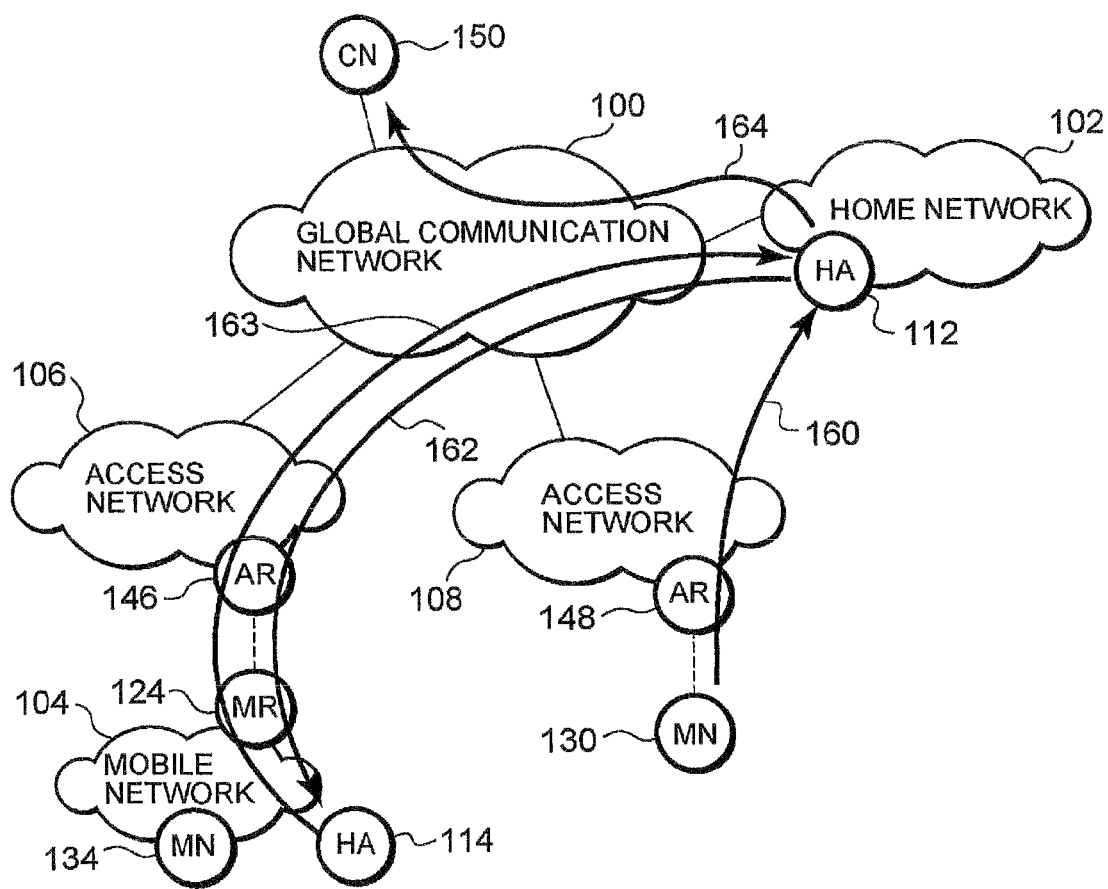
FIG. 14 is a drawing to explain a data packet routing path in the prior art as given in the arrangement example shown in FIG. 13.

Further, FIG. 1 shows the optimal route, which is the preferred effect of the present invention with respect to FIG. 14.

Here, data communication from MN 130 to CN 150 is not a tunnel passing through a plurality of home agents as shown in FIG. 14, and it is established by a tunnel passing through a single HA 112. This is a very preferable route because a single home agent within the home domain of MN 130 is used for the purpose of upgrading the binding. In this way, a more optimal route is achieved between MN 130 and CN 150. This is also useful when MN 130 and CN 150 achieve the most direct path by using route optimization technique. The reason for this is that the signaling relating to RR must pass through the home agent when route optimization is used.

In FIG. 1, when MN 130 transmits a data packet, this packet passes through a path 260 and is turned to tunnel with respect to the current home agent. The packet, which is turned to tunnel, is intercepted by HA 112, which has binding cache entry of MN 130. HA 112 decapsulates this packet and sends it to CN 150 via the path 264. Description will be given below on methods and systems to attain the desirable results in the preferred embodiment of the invention.

1st Embodiment

Figure 2:
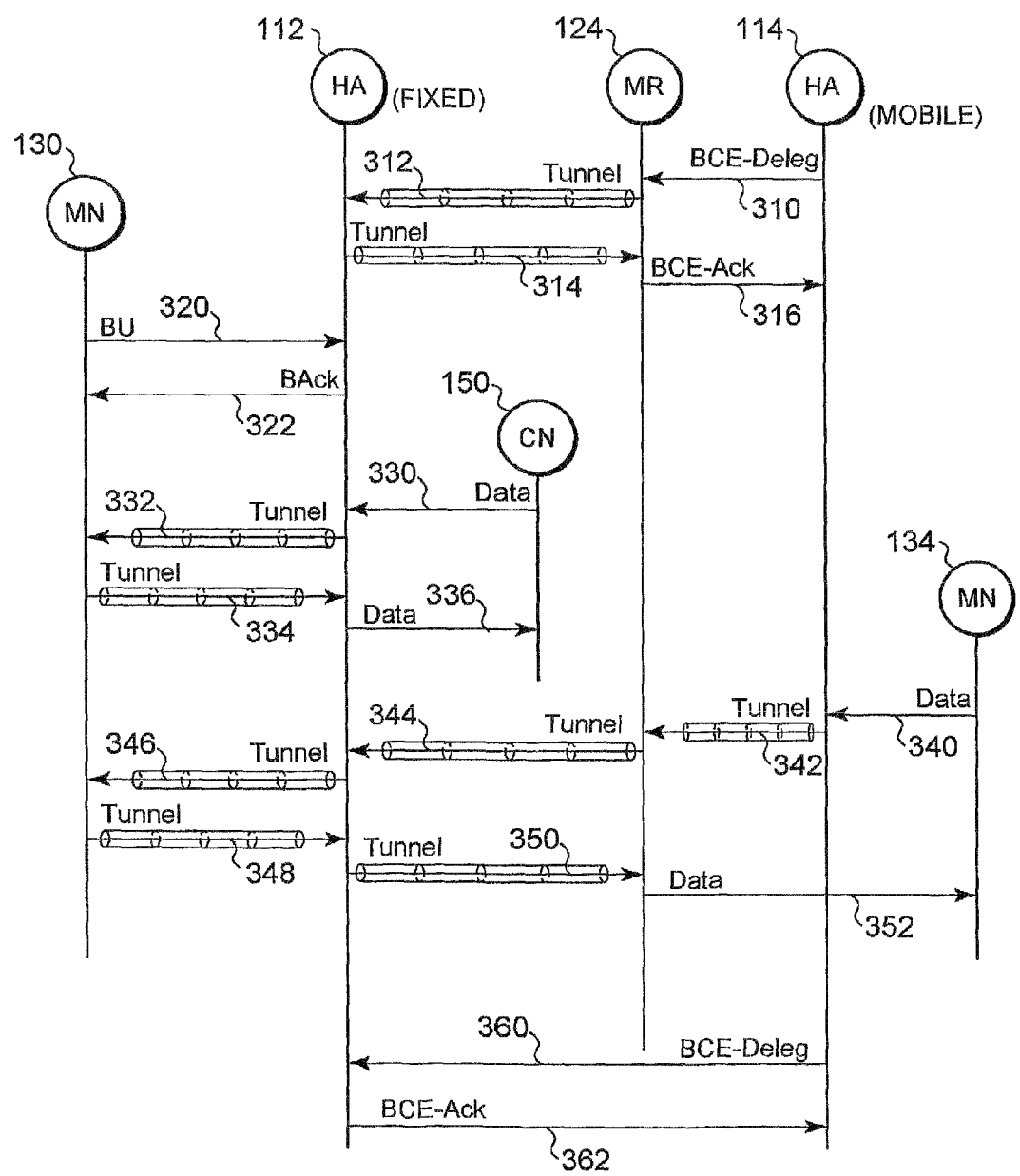
FIG. 2 is a chart to explain message sequence in the preferred first embodiment of the invention.
Figure 13:
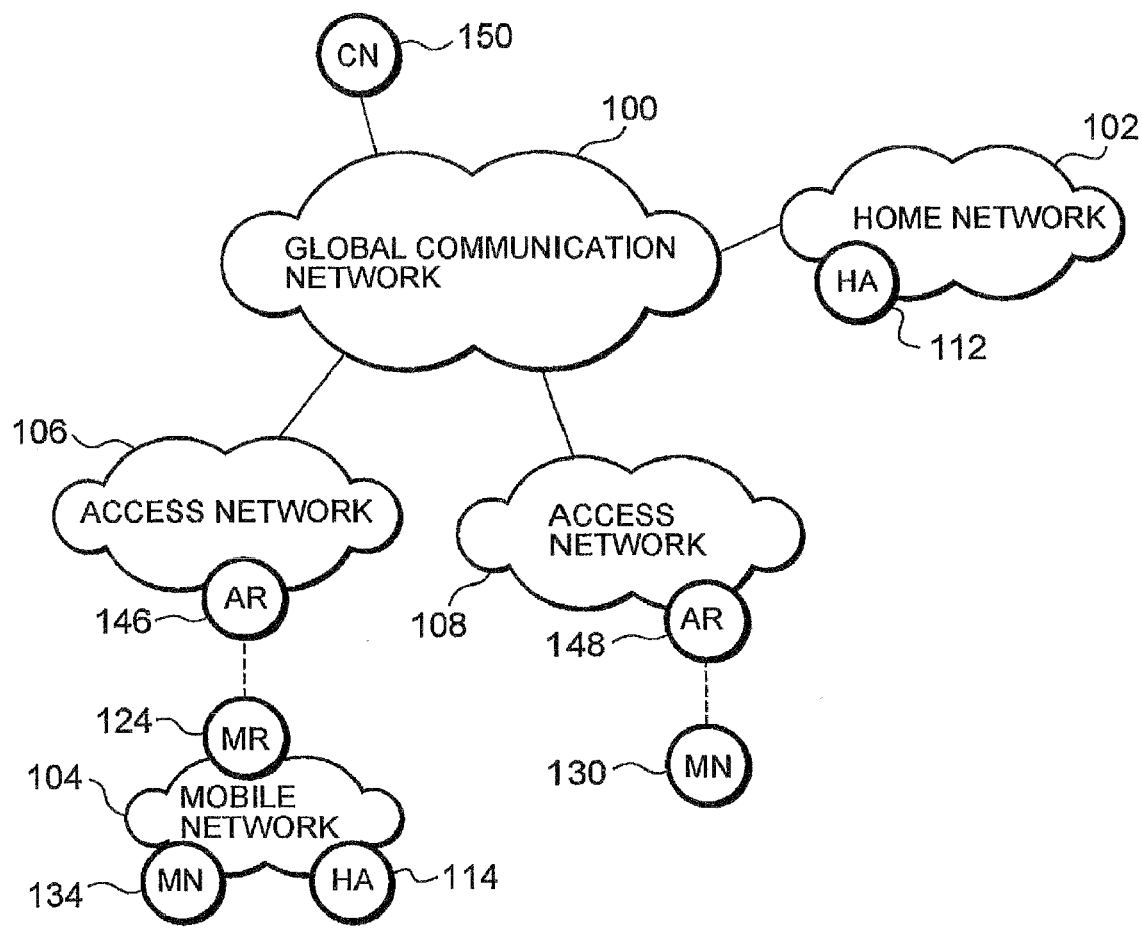
FIG. 13 is a drawing to explain a state where a mobile node is away from its home link and its home agent is away from its home link in an arrangement example in the prior art and in a preferred embodiment of the present invention.

FIG. 2 is a chart to show message in the preferred first embodiment of the invention in an arrangement example shown in FIG. 13. HA 114, which is directly connected to MR 124 in the mobile network 104, is away from the home network 102 (the "away" state). HA 114 can detect by using various means that it is not positioned within the home network 102 any more. The most desirable mechanism to attain this purpose is that MR 124 embeds special information to indicate to each node within the mobile network 104 that the network 104 is currently away from the home network 102. This is performed in router advertisement (RA), which MR 124 broadcasts to each node within the mobile network 104.

Because HA 114 is not positioned within the home network 102 any more, it is decided that functions and services of own home agent are delegated to a fixed home agent within the home network 102 and a more efficient route is attained for the mobile node by using the services of this fixed home agent. HA 114 can acquire address of the fixed home agent by using many methods. The most preferable method to acquire the address of the fixed home agent is to use manual preparing method to HA 114. Another preferable method is a method, in which HA 114 acquires the address of the fixed home agent from MR 124. (The information is embedded within RA, which is broadcast by MR 124, or other message given and taken between HA 114 and MR 124 is used.) In FIG. 2, the fixed home agent is HA 112.

In order to start the delegation of home agent functions from HA 114 to HA 112, HA 114 transmits a BCE delegation (BCE-Deleg) message 310 to HA 112. At MR 124, the BCE delegation message 310 is encapsulated as a tunnel packet 312 and it is turned to tunnel with respect to HA 112. HA 112 decapsulates the tunnel packet 312 and processes the BCE delegation message 310. When it is decided to accept this delegation, HA 112 transmits a BCE acknowledge (BCE-Ack) message, which is an affirmative response to HA 114. This BCE-Ack message is first encapsulated within the tunnel packet 314 and is turned to tunnel with respect to MR 124. Then, MR 124 decapsulates the tunnel packet 314 and transmits the inner BCE-Ack message 316 to HA 114. Thus, the delegation of the home agent functions is completed.

FIG. 2 shows message sequences 320 and 322 when MN 130 transmits a binding update (BU) message 320 to its home agent (HA 112) in order to indicate the delegation of home agent functions. This BU message 320 is intercepted by HA 112 and is processed by HA 112 for HA 114. HA 112 can transmit a binding acknowledgement (BA) message (BAck message) 322 for HA 114.

To indicate further details of the delegation of home agent functions, FIG. 2 shows message sequences 330, 332, 334 and 336, by which CN 150 and MN 130 give and take the data packet between them. When CN 150 transmits data packet (DATA) 330 addressed to MN 130, HA 112 intercepts this data packet 330 and it is turned to tunnel to the care of address of MN 130. This is shown as a tunnel packet 332. Similarly, the data packet from MN 130 to CN 150 is turned to tunnel to the home agent. This tunnel packet 334 is intercepted and decapsulated by HA 112 for HA 114. The decapsulated data packet 336 is processed by routing to CN 150 by using normal routing technique.

From the description as given above, it can be understood that more optimal and more efficient routing path from CN 150 is attained as shown in FIG. 2 by using the preferred first embodiment of the invention. Here, it does not mean that HA 114 has no need to execute all duties relating to home agent regardless of the fact that home agent functions have been delegated to HA 112. FIG. 2 shows the remaining duties to be attained by HA 114, which are the other characteristics of the present invention. Consideration should be given on the fact that MN 134, which is a mobile network node, belongs to the same mobile network 104 as HA 114. In case MN 130 and MN 134 are positioned within the same network, communication between MN 130 and MN 134 takes place by using a technique relating to link local neighbor discovery. However, in case MN 130 is departed from the mobile network 104, it is desirable that HA 114 executes Neighbor Discovery (ND) proxy to MN 130.

Otherwise, MN 134 completes the communication by suspending it when MN 130 is not positioned within the network 104 any more. FIG. 2 shows the message sequences 340, 342, 344 and 346. Here, if MN 134 transmits data packet (Data) 340 addressed to MN 130, it is the responsibility of HA 114 to intercept the packet 340. At HA 114, the tunnel packet 342 is further encapsulated. Next, the tunnel packet 344 doubly encapsulated by MR 124 reaches HA 112. HA 112 decapsulates this packet 344 twice and collects the original data packet 340. Then, this packet 340 is encapsulated within the tunnel packet 346 so that it is transferred to the care of address of MN 130.

This function is needed only when the packet is transmitted from MN 134 to MN 130. When MN 130 transmits the data packet, normal type home agent transfer is performed. This data is encapsulated within the tunnel packet 348 and is turned to tunnel to its home agent. HA 112 intercepts and decapsulates this tunnel packet 348 for HA 114. The destination is MN 134 in the mobile network 104, and HA 112 encapsulates this data packet in the tunnel packet 350 so that it is transferred to MR 124. MR 124 decapsulates this tunnel packet 350 and extracts a data packet 352. This data packet 352 is sent to MN 134 by routing.

Here, it is assumed that the time elapses and the mobile network 104 returns to the home network 102. When this condition occurs, the home agent functions are executed again. This is carried out by notifying to HA 112 that the execution of the home agent functions should be stopped. The message sequences 360 and 362 show this process. First, HA 114 transmits a BCE delegation (BCE-Deleg) message 360 to HA 112. This BCE delegation message 360 notifies to HA 112 that HA 114 is prepared to execute its duties. Then, HA 112 stops the operation as the home agent for HA 114. HA 112 transmits a BCE-Ack message 362 to HA 114 and notifies the current content of binding cache entry maintained for HA 114 to HA 114.

Figure 3:
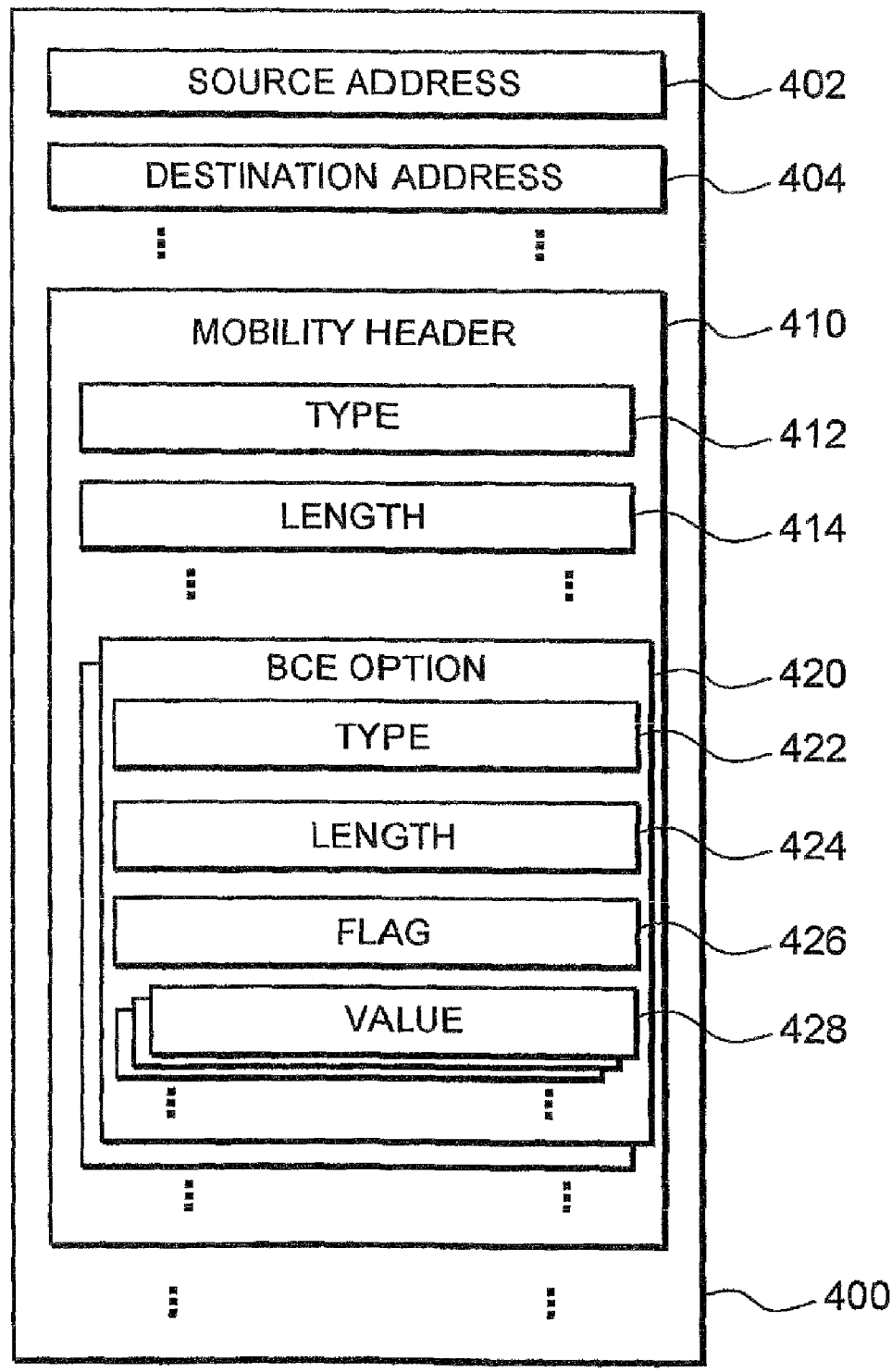
FIG. 3 is a drawing to explain packet structure of BCE delegation message in the preferred first embodiment of the invention.
Figure 4:
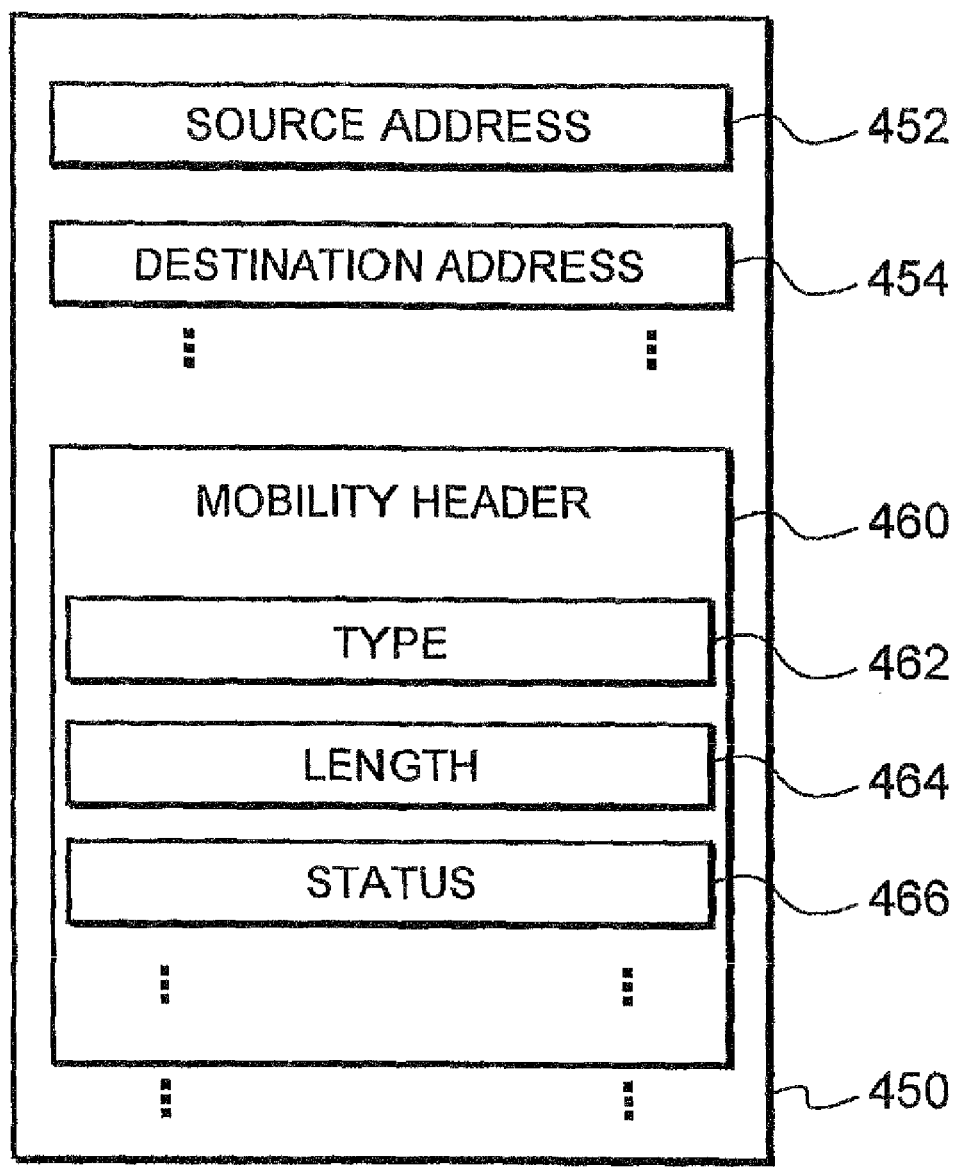
FIG. 4 is a drawing to explain packet structure of BCE acknowledgement message in the preferred first embodiment of the invention.

Description will be given now on packet structure of BCE delegation message and BCE-Ack message. These messages are executed by using several new types of mobility headers. FIG. 3 and FIG. 4 each represent packet structure of a BCE delegation message 400 and a BCE-Ack message 450 respectively. The BCE delegation message 400 accomplishes two principal purposes. First, by BCE delegation message 400, the transmitting side (e.g. HA 114) requests the receiving side (e.g. HA 112) to carry out the home agent functions. In the second place, the transmitting side notifies the current content of the binding cache entry to the receiving side. As a result, the receiving side can immediately act as the home agent of the mobile node, which is described in the binding cache entry. Explaining in more detail, the content of each binding cache entry to be transmitted is in the BCE option 420 within BCE delegation message 400 shown in FIG. 3.

The BCE delegation message 400 has a standard IPv6 header, which has a field 402 of source address and a field 404 of destination address. The BCE delegation message 400, which is a mobility protocol-related message, has a mobility header 410. Describing the mobility header 410 in more detail, a "type" field 412 indicates that this message is the BCE delegation message 400. A "length" field 414 specifies the length of the mobility header message. Those skilled in the art would understand that this message 400 might have a multiple of different options. For the purpose of the present invention, FIG. 3 shows only the BCE option 420.

The option 420 has a "type" field 422 to indicate that this option is a BCE option and also has a "length" field 424 to indicate the size of this option. Also, a "flag" field 426 contains a plurality of flags to indicate as to which type of "value" is within one or more of the "values" field of the BCE option 420. The field 428 of each "value" can include different parameters of binding cache entry in response to the flag in the "flag" field 426. This "value" includes home address value and the care of address of the binding cache entry but it is not limited to these. Also, the mobile node can have a plurality of care of addresses to be connected to one home address by binding. Therefore, it may include one or more substitute care of addresses. In case the binding cache entry contains binding information of the mobile router, it may be so designed that one or more "value" fields 428 contains mobile network prefix to be managed by the mobile router. Also, one "value" field 428 may include necessary security parameters, by which the receiving side will have to establish security relating to the mobile node as indicated by the binding cache entry.

For the purpose of explaining how the "flag" field 426 and the "value" field 428 fulfill functions in cooperation, the arrangement given below may be adopted. Specifically, a first bit of the "flag" field 426 indicates whether the field of the home address value is present or not. A second bit indicates whether a field of primary care of address value is present or not. A third bit may indicate whether mobile network prefix is present or not. These "flag" fields 426 vary according to the fact that the content of the BCE option 420 is a mobile host or a mobile router or a multi-mode terminal. Therefore, the content of this data changes. By using the flag field 426, various types of data are transferred. By using flag field to indicate the various types of addresses, better bandwidth efficiency can be achieved than sending standard size packet having all possible fields where it is defined that NULL data can be possessed. The receiver of this BCE option 420 can decide which parameter has been transmitted in the BCE delegation message 400 by simply seeing the value, which is set within the flag field 426.

Those skilled in the art would easily understand that FIG. 3 shows the content of a part of the BCE delegation message 400 and that the other contents (not shown) may be included within the BCE delegation message 400. For instance, it may be so arranged that sequence number is assigned for the tracking of each BCE delegation message 400, and that it can be confirmed which is the BCE delegation message 400 in question among a plurality of BCE delegation messages 400.

FIG. 4 shows packet structure of the BCE acknowledgement (BCE-Ack) message 450. The BCE-Ack message 450 is used to acknowledge (giving affirmative response to) the BCE delegation message 400 and has a standard IPv6 header provided with a field 452 of source address and a field 454 of destination address. As a mobility protocol-relating message, the BCE-Ack message 450 has a mobility header 460. The "type" field 462 specifies that this message is a BCE-Ack message, and the "length" field 464 indicates the length of the mobility header 460.

This packet structure is simpler than that of the BCE delegation message 400. The reason is: the confirmation to show that the home agent has simply accepted BCE transfer can be given by merely generating it in the "status" field 466 within the mobility header 460. If the home agent does not accept BCE delegation request after detecting error in the packet structure of the BCE delegation message 400, the BCE-Ack message 450 contains one or more BCE options (not shown in FIG. 4) so that it can be notified which parameter has been transmitted by error. The BCE option used within the BCE-Ack message 450 is similar to the BCE option 420 within the BCE delegation message 400. One "value" field may contain information to notify which parameter of the BCE option 420 in the BCE delegation message 400 is an error to the receiver. The "flag" field 426 shows whether the "value" field 428 is present or not.

In the above, description has been given on packet structure of major signalings necessary for carrying out this basic method of the present invention. Next, description will be given on functional structure of major nodes in the present system. To achieve the present invention, functional structures of the device used as the mobile home agent (e.g. HA 114) and the fixed home agent (e.g. HA 112) are shown in FIG. 5 and FIG. 6 respectively.

Figure 5:
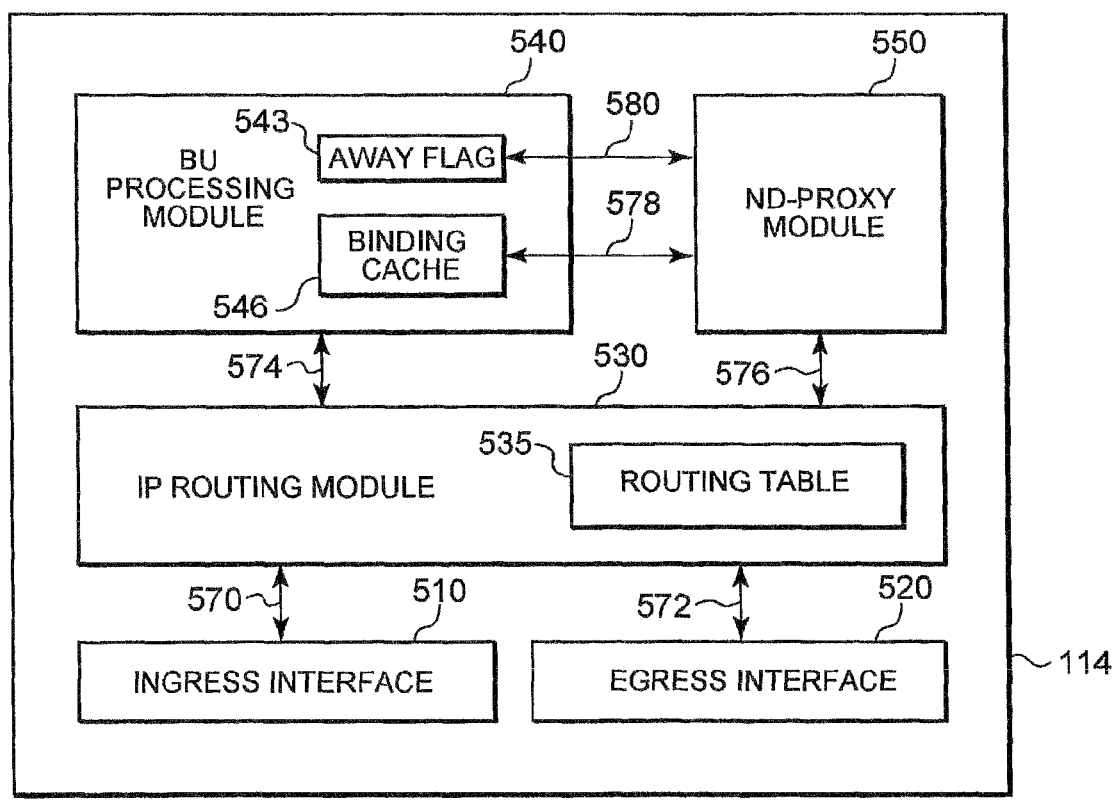
FIG. 5 is a block diagram to show basic arrangement of a mobile home agent in the preferred first embodiment of the invention.
Figure 6:
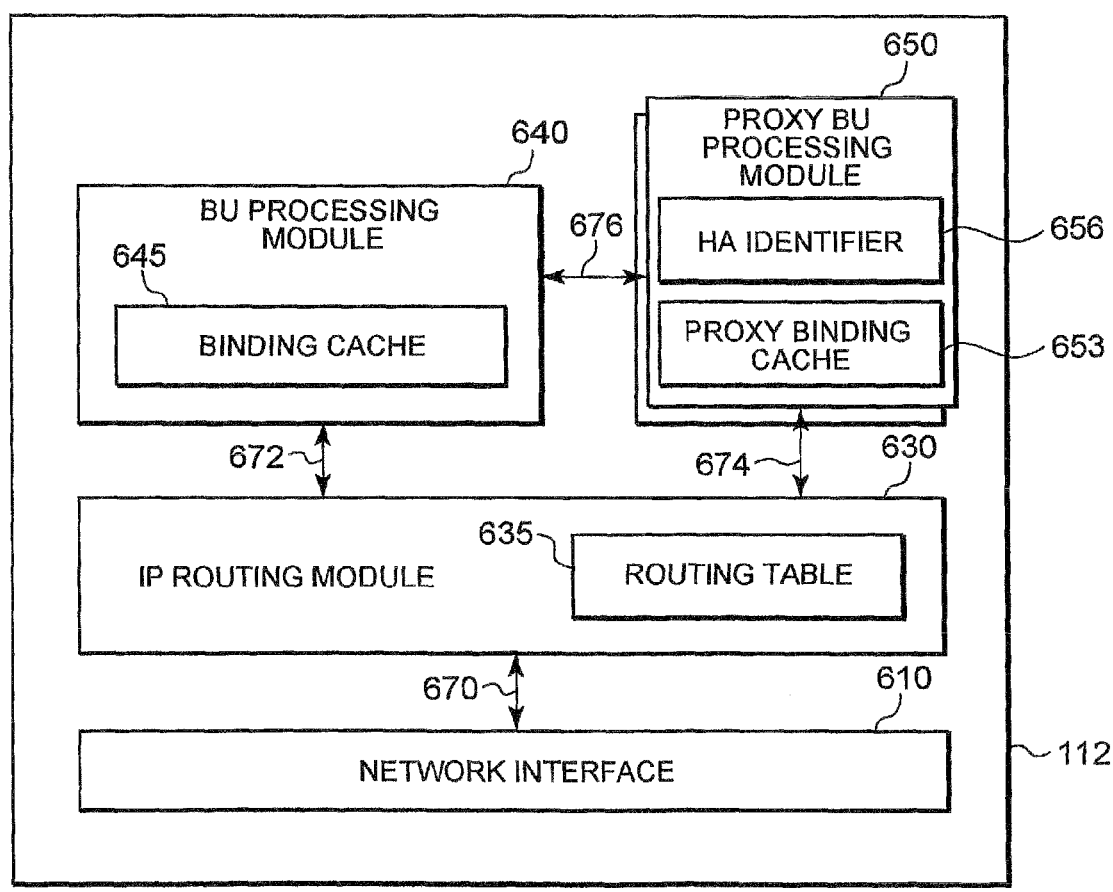
FIG. 6 is a block diagram to show basic arrangement of a fixed home agent, to which binding cache entry is transferred in the preferred first embodiment of the invention.

FIG. 5 shows functional structure of HA 114. HA 114 has one or more ingress interfaces 510, one or more egress interfaces 520, an IP routing module 530, a BU (Binding Update) processing module 540, and an ND (Neighbor Discovery) proxy module 550. Signal paths 570, 572, 574, 576, 578 and 580 represent data and signaling paths between these module/interfaces 510, 520, 530, 540, and 550.

In FIG. 5, two interfaces 510 and 520 are discriminated from each other and this is because the packets to be transmitted via the interfaces 510 and 520 delicately differ when the node (HA 114) leaves the home network 102. For instance, when the home agent leaves the home network, the update of route should not be sent via the egress interface 520 because the egress interface 520 is a different prefix and is probably connected to an external sub-network of a different routing protocol. However, it is necessary to participate in the message relating to neighbor discovery so that packet transmission of link local is carried out and the packet to be sent to Care of Address can correctly reach the address via the egress interface 520. Each of the network interfaces 510 and 520 represents hardware, software and protocol for all networks, which are necessary to perform communication with other nodes by using link access technique of the home agent. There may be one or more ingress interfaces 510 in the same manner as the case of the egress interfaces 520.

The IP routing module 530 represents all IPv6-related routing mechanisms to be supported by this home agent, MIPv6-related routing mechanism, NEMO basic support-related routing mechanism, and new mechanism necessary for supporting this protocol. This new mechanism generates adequate delegation message when it leaves the home network 102 (the "away" state) and when it is positioned in the home network 102 (the "at home" state). The IP routing module 530 has a routing table 535. The routing table 535 is used to find the address of the next hop to reach the destination (may be a link local address or a global address).

At another module, there is provided a BU (Binding Update) processing module 540 in the home agent 114. The BU processing module 540 is primarily used for the purpose of making the BU message effective and for accumulating related parameters from the effective BU message within the binding cache 546.

As described above, after leaving the home network 102, HA 114 must act as a neighbor discovery (ND) proxy of all mobile nodes, in which binding cache entry is delegated to other home agent. ND proxy is performed in normal MIPv6 HA operation. The method associated with module 550 is a different one in the sense, ND proxy is carried out for mobile nodes to which there is no binding cache entries at the HA. Only when this home agent leaves the home network 102, the ND proxy module 550 is activated, and necessary signaling related to the neighbor discovery proxy takes place. Let us consider two types of scenarios for better understanding of the operation between these functional entities. One is the case where HA 114 is positioned at the home network 102 (the "at home" state), and the other is the case where HA 114 leaves the home network 102 (the "away" state). By studying these two types of scenarios, description will be given below as to which functional entity becomes active and how it works.

First, when it is positioned in the home network 102, HA 114 clears away the flag 543. If the next hop routing address other than the address of default router is not available in the routing table 535, packet parameters of "data packet/key" are sent to the BU processing module 540, and it is checked whether BCE for a specific destination is available or not. On the other hand, if it is available, the related parameters are acquired via the interface 574 from BCE, and a tunnel packet can be built up at the IP routing module 530, and the data packet can be sent via the related interface identified by the IP routing module 530. Once the related interface is identified, the packet is sent to an adequate ingress interface 510 via a signal path 570, and it is then transferred.

When moving from a home link (home network 102), HA 114 sets an away flag 543 and sends a delegation message addressed to HA 112 to the IP routing module 530 via a signal path 574. In addition, HA 114 starts an ND proxy module 550 via a signal path 580 so that the ND proxy module 550 can carry out neighbor discovery proxy operation via a signaling path 576.

FIG. 6 shows basic arrangement of HA 112. HA 112 has a normal BU processing module 640, a proxy BU processing module 650, an IP routing module 630, and one or more network interfaces 610. Signal paths 670, 672, 674 and 676 each represents a path of data and signaling between these modules 640, 650, 630 and 610.

Because it is assumed that HA 112 is not mobile, there is no need to discriminate the ingress interface 510 from the egress interface 520. Those skilled in the art would easily understand that simple and apparent change can be added to the basic arrangement of HA 112 without departing from the scope of the present invention even when HA 112 is mobile. Therefore, FIG. 6 shows only functional blocks of the network interface 610. The network interface 610 has hardware, software and protocol necessary for basically achieving the data link layer and physical layer functionality. The IP routing module 630 has all of the standard IPv6 and MIPv6 routing techniques and also NEMO basic support related mechanism, which is specific to this protocol. For instance, when HA 112 receives various types of BCE delegation messages 400, it may be necessary to identify them, or it may be necessary to send correct BCE-Ack message 450.

When the data packet is received at the network interface 610, this data packet is sent to the IP routing module 630 via the signal path 670. Then, this data packet is checked by the IP routing module 630, and the address of the next hop is checked in a routing table 635. In case destination address other than the address of default router is not found as the address of the next hop in the routing table 635, this data packet is checked by a BU processing module 640 and by the proxy BU processing module 650.

In case destination address of this data packet is at the binding cache 645 of the BU processing module 640, this data packet is turned to tunnel to the care of address as specified at the binding cache 645. In case the destination address of this data packet is identified at a proxy binding cache 653 of the proxy BU processing module 650, this data packet is sent to the care of address identified at the proxy binding cache 653. Regardless of whether it is from the binding cache 645 or it is from the proxy binding cache 653, the tunnel packet is built up at the IP routing module 630 after the care of address is obtained. The parameters relating to the build-up of the tunnel packet are obtained via the signal paths 672 and 674.

Here, it is essential to understand that HA 112 can provide proxy services to a plurality of mobile home agents. In this case, it may have a plurality of proxy binding caches 653. The proxy BU processing module 650 and the BU processing module 640 simply perform processing on the mobility-related message intercepted by HA 112. Mutual operation between the proxy BU processing module 650 and the BU processing module 640 is carried out via the signal path 676. The signal path 676 is used to transfer the data packet, which cannot be discovered at specific binding caches 645 and 653.

Here, those skilled in the art would easily understand that each of the basic arrangements shown in FIG. 5 and FIG. 6 shows minimum functional blocks to realize the mobile home agent and the fixed home agent of the present invention. In fact, however, several other functions are needed (e.g. functions such as accounting, authentication, access control).

Figure 7:
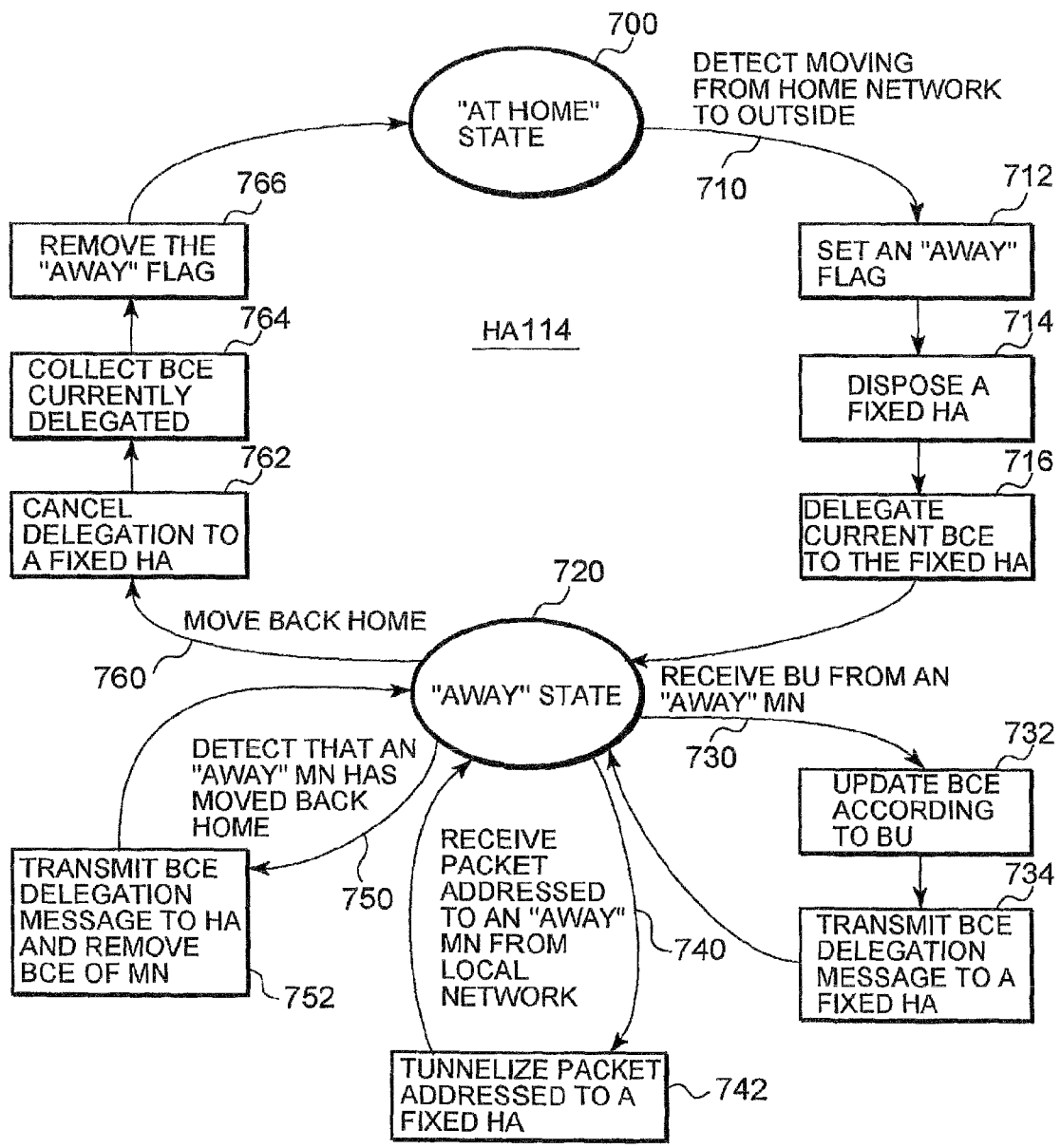
FIG. 7 is a drawing to explain state transition relating to a mobile home agent to show the main invention in the preferred first embodiment of the present invention.

In this preferred embodiment, further description will be given below on the operation of the mobile home agent (e.g. HA 114) by referring to state transition to perform this operation. FIG. 7 shows state transition of HA 114, which consists of an "at home" state 700 and an "away" state 720. In the "at home" state 700, HA 114 basically performs the functions as described in MIPv6 and NEMO basic support protocol. The "away" state 720 occurs when it is detected that HA 114 has moved out of the home network 102 (the event 710). When the event 710 takes place, transition steps 712, 714 and 716 follow, in which transition occurs from the "at home" state 700 to the "away" state 720. In Step 712, HA 114 sets an "away" flag 543. Next, in Step 714, HA 114 places an adequate fixed home agent (HA) within home domain and/or network. When an adequate fixed home agent is identified, HA 114 delegates current binding cache entry to the fixed home agent within the home domain and/or network by one or more BCE delegation messages 400 in Step 716 (to facilitate the explanation, it is assumed that it is HA 112).

In the "away" state 720, each of several events 730, 740 and 750 starts self-transition. Also, in one event 760, it is shifted from the "away" state 720 to the "at home" state 700. The event 730 takes place when HA 114 receives BU from an "away" mobile node (MN). By the event 730, the steps 732 and 734 and the self-transition following after the steps 732 and 734 occur. In Step 732, HA 114 updates the binding cache entry (BCE) according to the received BU. In Step 734, HA 114 sends the BCE delegation message 400 to the identified fixed home agent (HA 112).

The event 740 occurs when HA 114 receives the packet, which is sent from a local network to an "away" mobile node. By the event 740, self-transition of Step 742 takes place. In Step 742, the received packet is turned to tunnel to be transferred to the fixed home agent (HA 112). The event 750 occurs when the "away" mobile node detects that it has returned to the mobile network 104 where HA 114 is positioned. By the event 750, self-transition of Step 752 takes place. In Step 752, HA 114 sends the BCE delegation message to HA 112 and request the removal of BCE associated with the mobile node, which has moved back home. Here, those skilled in the art would easily understand that the BCE delegation message to be sent when executing Step 752 is different from the main BCE delegation message 400 as shown in FIG. 5. In this case, the purpose is to request the removal of BCE from the mobile node, which has moved back home. Therefore, BCE option preferably contains a single value 428 to procure the home address of the mobile node.

The "away" state 720 returns to the "at home" state 700 when the event 760 occurs. The event 760 occurs when it is detected that HA 114 has moved back home. This transition includes Steps 762, 764 and 766. In Step 762, HA 114 notifies to HA 112 that HA 112 need not be a proxy any more because HA 114 has moved back home. In Step 764, HA 114 collects all binding cache entries, which HA 112 has been maintaining during the period of the "away" state. Preferably, this can be attained when HA 112 transfers the binding cache entry in one or more BCE-Ack messages. In Step 766, HA 114 clears the "away" flag 543.

In the preferred embodiment as described above, HA 114 and MR 124 are described as different entities, while it would be apparent to those skilled in the art that it can be actually realized even when these are the same entity. In this case, in the first place, HA 114 can automatically know whether the mobile network 104 is currently within home or it is away from home. Secondly, HA 114 can automatically know the available home agent (HA 112), and it is very easy and simple to carry out the present invention.

In the embodiment as described above, it is not assumed whether MN 130 knows the change of the home agent (from HA 114 to HA 112) or not. Detailed description will be given below on the operation of the present invention, in which the change of the home agent is transmissive with respect to MN 130.

This is called BCE transmissive transfer method hereinafter. In this case, HA 112 acts as a proxy home agent of a true home agent (HA 114) of the mobile node, and the mobile node does not know it. The main advantage is that there is no need to give changes in the functions of the mobile node and it is satisfactory as far as scalability is concerned. Further, there is no need to explicitly notify the mobile node about the change of the home agent.

If this BCE transmissive transfer method is to be supported by HA 114, the changes necessary in the state transition chart of FIG. 7 when the "away" mobile node moves back home in the event 750 is such that, HA 114 has no need to rely on HA 112 to have binding update message by acquiring the binding message directly from the mobile node. In this case, HA 114 must send message to HA 112 so that MN 130 is removed from BCE and the proxy for MN 130 is stopped at HA 112.

If MR 124 and HA 114 are a single entity, the information that "it has left home" and the information that "it has moved back home" can be obtained from the prefix advertised on external link. If MR 124 is an entity different from HA 114, HA 114 must be notified of information embedded in an adequate signaling message (e.g. information embedded in the router advertisement message). Further, in case MR 124 and HA 114 are at the same position, HA 114 must send BU addressed to its home agent (i.e. HA 112) when a new external link has been discovered or when the effective time of BU has expired.

For the better understanding of the present invention, description will be given below on a processing algorithm, which HA can use for acting as a proxy home agent in the BCE transmissive transfer method. In this method, the processing step relating to HA 112 is more complicated. This is because HA 112 has three modes relating to itself. A normal home agent operation to a mobile node, which acquires home address from the prefix advertised by HA 112 (e.g. MR 124). HA 112 also must operate as a normal router for other nodes positioned within the home network 102. HA 112 acts as a proxy home agent to the binding cache entry delegated from other home agent. As the new role as the proxy home agent, HA 112 must act as a proxy for HA 114 and for all mobile nodes, to which binding information has been transferred transmissively. Further, as a proxy home agent, HA 112 must insert the address of HA 112 as the source address within the tunnel header of the packet to be sent to the mobile node, which is not aware of the role of HA 112.

Figure 8:
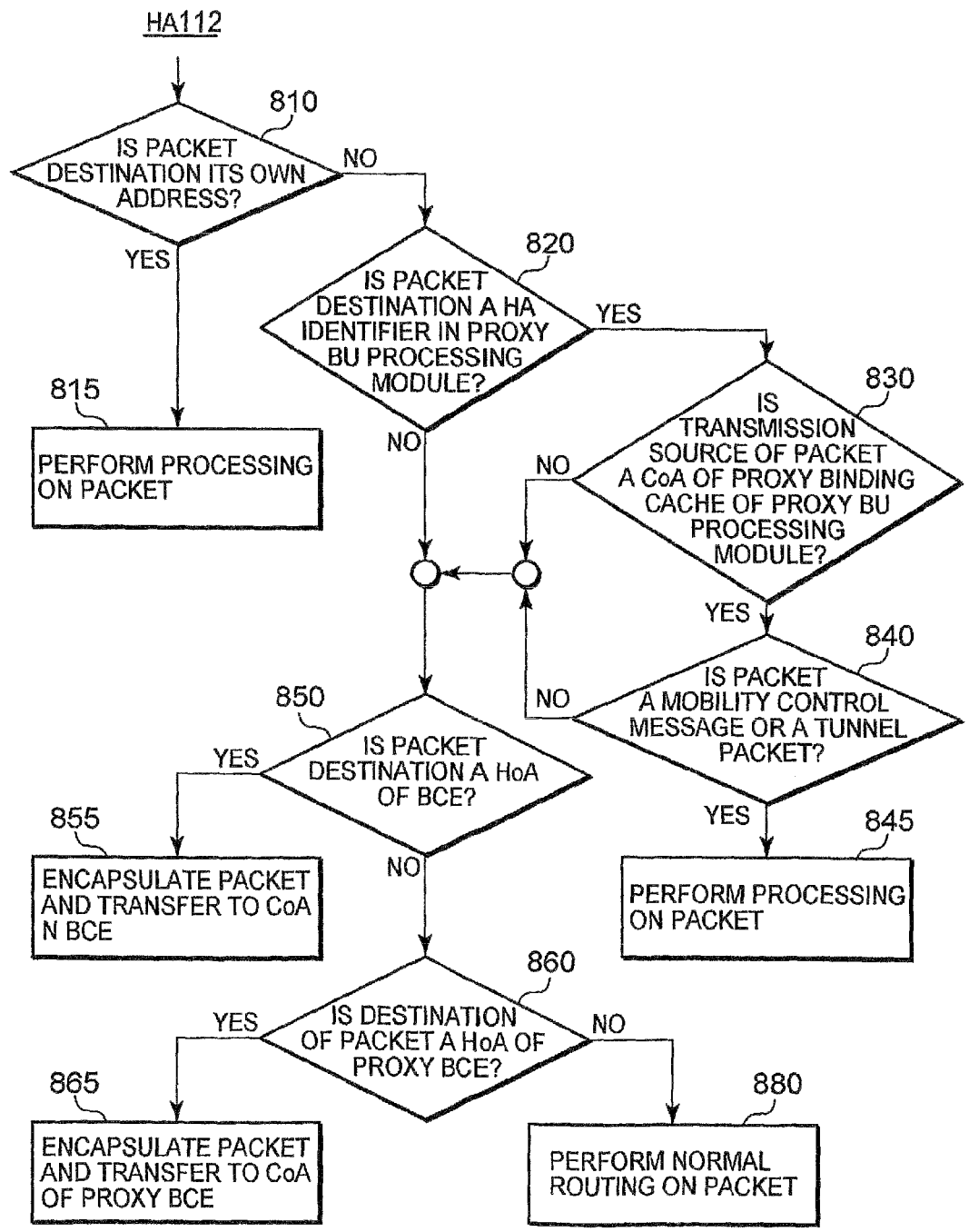
FIG. 8 is a flow chart to show processing algorithm to be provided at the fixed home agent when BCE transmissive (transparent) transfer method is used in the preferred first embodiment of the invention.

FIG. 8 shows steps of processing when HA 112 receives the packet in the BCE transmissive transfer method. First, in Step 810, HA 112 checks whether the received packet is addressed to itself or not. If it is addressed to itself, HA 112 performs normal processing on the packet in Step 815. On the other hand, if it is not addressed to itself, HA 112 advances to an identifying step 820 and checks whether or not the destination of the received packet is HA identifier 656 (FIG. 6) in one of the proxy processing modules 650. If so, HA 112 further checks whether or not the source address of the received packet is equal to the care of address (CoA) of the entry in the proxy binding cache entry 653 in the proxy BU processing module 650 as shown in Step 830. If so, HA 112 further checks whether the received packet is a mobility protocol message or a tunnel packet as shown in Step 840. If the received packet is a mobility protocol message or a tunnel packet, HA 112 performs processing on the received packet for the home agent, which is identified by the HA identifier 656 in the proxy BU processing module 650 as shown in Step 845.

This implicitly indicates that HA 112 transmits a binding acknowledge message to mobile node, which operates as a proxy home agent from the mobile node, by updating the proxy BCE table in case the received packet is a mobility-related message. Those skilled in the art would easily understand that this binding acknowledgement message has a source address equal to the HA identifier 656. If the received packet is a tunnel packet, HA 112 decapsulates the received packet and transfers the inner packet to its destination.

On the other hand, if the result is "No" in all of Steps 820, 830 and 840, HA 112 goes to Step 850. In Step 850, HA 112 checks whether the destination of the received packet is the home address (HoA) in the binding cache entry or not. If so, HA 112 carries out Step 855 by turning the destination to the care of address (CoA) and also by turning the source address of the tunnel to the address of HA 112 and encapsulates the received packet. If not so, HA 112 checks in Step 860 whether the destination address of the received packet is the home address (HoA) in the proxy binding cache 654 or not. If so, HA 112 encapsulates the received packet to the care of address (CoA) described in the proxy binding cache 653 as shown in Step 865. If not so, the received packet is processed by normal routing in Step 880.

2nd Embodiment

In the first embodiment as described above, description has been given on operation according to the present invention, in which the change of the home agent is transmissive with respect to MN 130. In the preferred second embodiment as given below, description will be given on a method to know the change of the home agent, by which the mobile node (i.e. MN 130) knows the change of the home agent. Hereinafter, this method is referred as BCE non-transmissive transfer method.

Here, the delegation of BCE takes place as shown in FIG. 1, FIG. 2, FIG. 3, FIG. 4, and FIG. 5. However, the difference is that the mobile node correctly knows the change of the home agent from the mobile agent (i.e. HA 114) to a fixed home agent (i.e. HA 112). Major advantage of this method is that complicated processing of the fixed home agent (HA 112) can be simplified. Further, HA 112 has no need to perform the proxy-related signaling for HA 114.

Figure 9:
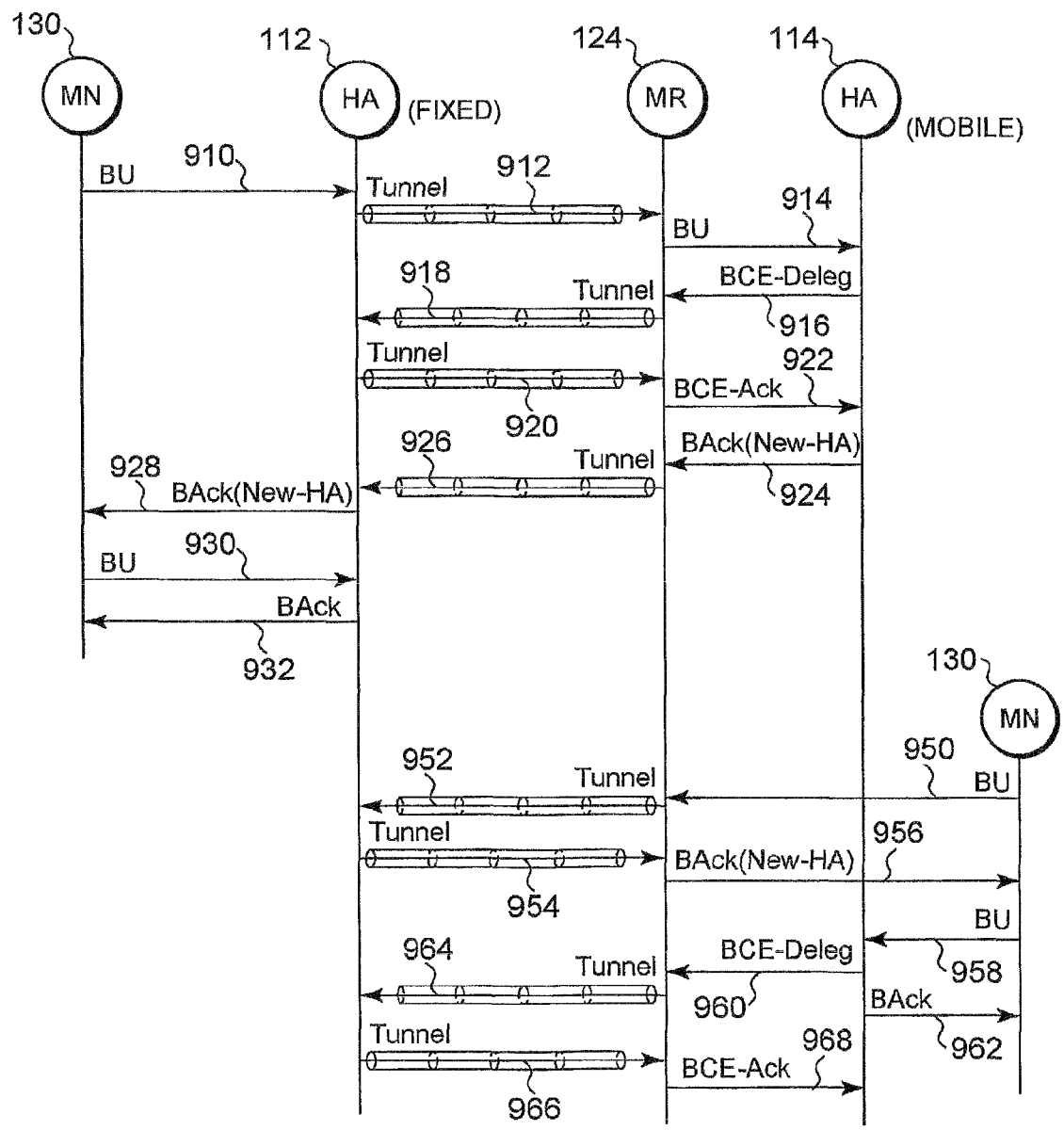
FIG. 9 is a chart to show message sequence relating to BCE non-transmissive (non-transparent) transfer method in a preferred second embodiment of the invention.
Figure 10:
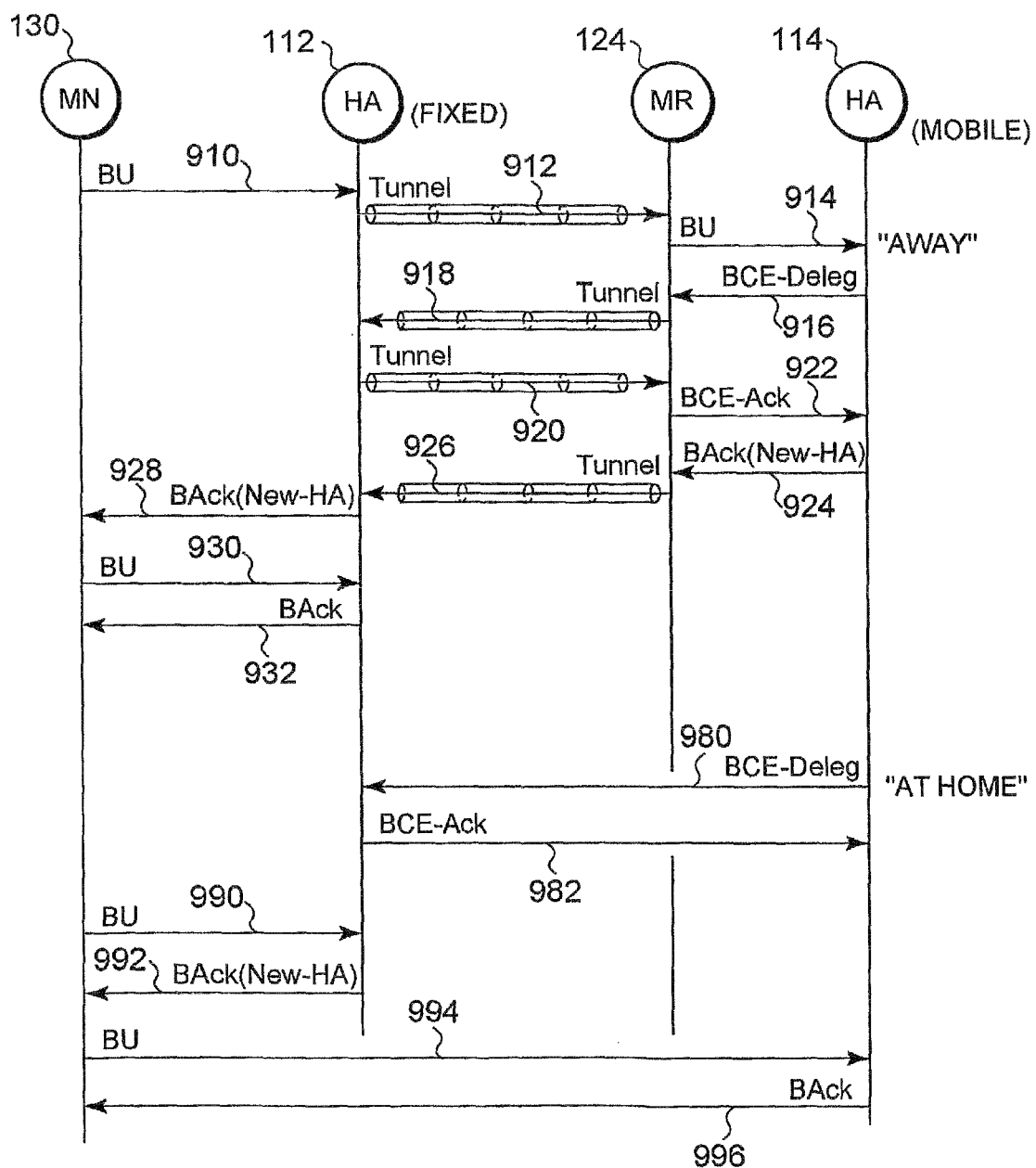
FIG. 10 is a chart to show message sequence relating to BCE non-transmissive transfer method in the preferred second embodiment of the invention.

In the preferred second embodiment, the message sequences shown in FIG. 9 and FIG. 10 are used. In FIG. 9, HA 112 is a fixed home agent, and HA 114 is a mobile home agent positioned in an external domain. In this case, MN 130 transmits a BU message 910, which is positioned on the external link and addressed to HA 114. This BU message 910 is intercepted by HA 112 and is encapsulated in a tunnel packet 912 addressed to MR 124. MR 124 decapsulates the tunnel packet 912, and sends an internal BU message 914 (the same as the BU message 910) to HA 114. In this case, HA 114 is currently positioned within an external domain and transmits a BCE delegation (BCE-Deleg) message 916 to HA 112. This message 916 contains BCE option, which is a request necessary for temporarily shifting MN 130 to the control of HA 112. Or, the BCE delegation message 916 contains a security token necessary for establishing security relation for MN 130 and HA 112.

This BCE-Delegation message 916 is encapsulated in a tunnel packet 918 to be sent to HA 112 by MR 124. HA 112 sends back the BCE-Ack message 922 addressed to HA 114 if it agrees to become a new home agent. The BCE-Ack message 922 is encapsulated again as a tunnel packet and is transferred to MR 124. Upon receipt of the BCE-Ack message 922, HA 114 notifies the change of the home agent to MN 130. This notification is given by a binding acknowledge (BAck) message (New HA) 924 to respond to BU 914 of MN 130. This BAck message 924 contains the address of the new home agent (HA 112), or preferably an option in BU mobility header. In addition, the BAck message 924 is preferably contains a security token necessary for establishing security relation for MN 130 and HA 112.

The BAck message 924 is sent to the care of address of MN 130, and it is encapsulated in a tunnel packet 926 at MR 124 and is transferred to HA 112. HA 112 decapsulates this packet 926 and transfers an internal BAck message 928 (the same as BAck message 924) to MN 130. Upon receipt of this response, MN 130 knows that it is necessary to change own home agent to HA 112. Therefore, MN 130 transmits a new BU message 930 to HA 112. After processing the BU message 930, HA 112 acknowledges binding registration by a BAck message 932.

Next, description will be given on a case where MN 130 moves back to own home network (mobile home network 104) but HA 114 is still in the external domain. This case is shown by the messages 950-968 in the message sequence chart of FIG. 9. By performing the matching of the prefix advertised in the home network with the prefix of home address, MN 130 knows that it has returned to own home network and indicates that MN 130 has returned to own home network. A BU message 950 addressed to HA 112 is sent. This BU message 950 is turned to tunnel (tunnel packet) to be sent to HA 112 by MR 124. HA 112 checks the inner packet in the tunnel packet 952 and recognizes that MN 130 has returned to own home network.

HA 112 does not fulfill the functions as a home agent of MN 130 and sends back the control of BCE relating to MN 130 to HA 114. For this purpose, HA 112 first sends a BAck message (New HA) 956 to MN 130 by the tunnel packet 954 and notifies that the new home agent of MN 130 is HA 114. After processing the BAck message 956, MN 130 sends the BU message 958 to HA 114, which is the new (in fact, its original) home agent. After processing the BU message 958, HA 114 sends a BCE delegation requesting packet 960 to HA 112 via the tunnel packet 964 so that BCE entry relating to MN 130 is removed. Also, HA 114 sends a BAck message 962 to MN 130 and accepts the BU message 958. After removing BCE related to MN 130, HA 112 sends a BCE-Ack message 968 via the tunnel packet 966 and stops the function as a home agent for MN 130.

For the better understanding of the BCE non-transmissive transfer method, description will be given below on a case where HA 114 moves back home. The message sequence chart of FIG. 10 shows the signaling necessary in this case. The message sequences 910-932 are exactly the same as those shown in FIG. 9, and detailed description is not given here. After going back home, HA 114 tries to take back BCE from HA 112. For this purpose, HA 114 first transmits a BCE delegation message 980 to HA 112. This message 980 does not contain BCE option. Preferably, this BCE delegation message 980 can have a flag to indicate that it is a message to collect the entry as previously delegated. Because HA 114 is positioned at home, the BCE delegation message 980 is sent to HA 112 in the routing by using normal IPv6 routing technique. Upon receipt of the message 980, HA 112 identifies whether the BCE originally belongs to HA 114 or not and transfers this BCE as a BCE-Ack message 982 addressed to HA 114.

In this BCE non-transmissive transfer method, it must be notified that the new home agent is not HA 112 any more and it is HA 114. In this respect, when a BU message 990 from MN 130 reaches HA 112, HA 112 inserts the address of HA 114 into a BAck message 992 addressed to MN 130. After receiving the BAck message 992, MN 130 transmits a BU message 994 to HA 114. Upon receipt of the BU message 994, HA 114 transmits a BAck message 996.

Figure 11:
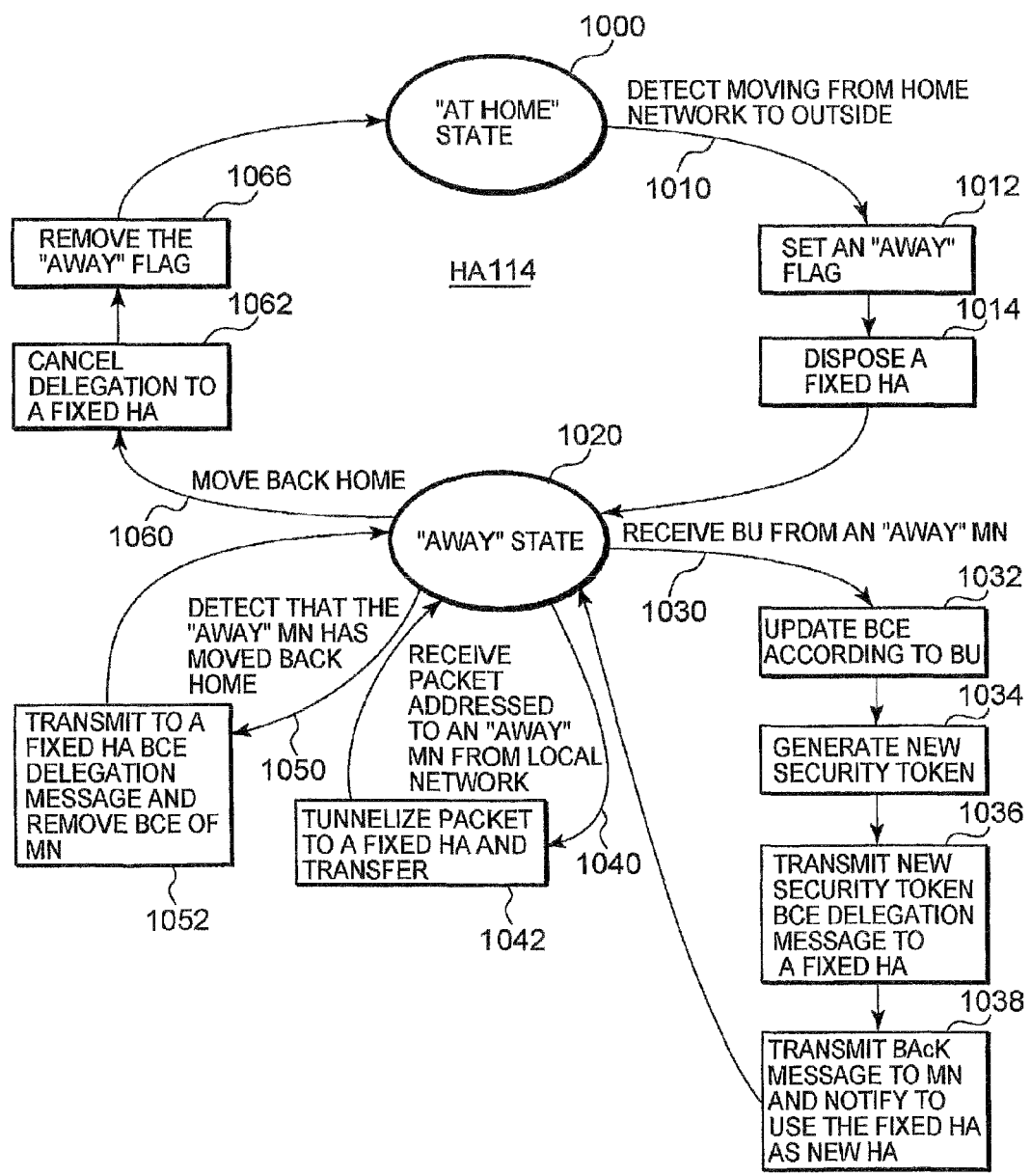
FIG. 11 is a drawing to explain state transition relating to a home agent when the BCE non-transmissive transfer method is performed in the preferred second embodiment of the invention.

FIG. 11 shows functions of HA 114 in case non-transmissive change of the home agent is carried out. In this figure, two major states of HA 114 are shown, i.e. the "at home" state and the "away" state. In the "at home" state 1000, HA 114 fulfills the function just like a normal router, which has functions of a home agent as described in MIPv6 and NEMO basic support. After HA 114 detects that it has moved out of the home domain (the event 1010), HA 114 moves from the "at home" state 1000 to the "away" state as shown in the state transition steps 1012 and 1014. At the step 1012, HA 114 sets up an "away" flag. In the next Step 1014, HA 114 places a fixed home agent (i.e. HA 112).

In the "away" state 1020, several events 1030, 1040 and 1050 start self-transition. Also, by a single event 1060, it is turned from the "away" state 1020 to the "at home" state 1000. The event 1030 occurs when HA 114 receives BU from MN in the "away" state, and self-transition is started, which consists of Steps 1032, 1034, 1036 and 1038. In Step 1032, HA 114 updates BCE according to BU. Next, as shown in Step 1034, HA 114 generates a new security token for establishing security relation between the fixed home agent and the mobile node. In Step 1036, HA 114 delegates this new security token to the fixed home agent. In Step 1038, HA 114 notifies the change of the home agent to the mobile node as a BAck message. Until this moment, HA 114 must execute the duty of ND proxy when the mobile node has left the home link.

In the event 1040, when HA 114 receives a packet addressed to the mobile node in the "away" state from a local network, self-transition of Step 1042 is started. In Step 1042, HA 114 turns the packet addressed to the fixed home agent (i.e. HA 112) to tunnel and sends it to the mobile node. The event 1050 is started when the mobile node moves back home. As explained in the above, when the mobile node returns to the home link, HA 112 notifies the mobile node to change its home agent to HA 114. Therefore, the event 1050 is started when the mobile node has transmitted a BU message addressed to HA 114, which does not contain the care of address. In the event 1050, self-transition of Step 1052 is started. In Step 1052, HA 114 sends a BCE delegation message to HA 112 and collects (removes) BCE of the mobile node at HA 112.

As shown in the event 1060, the "away" state takes place when it is discovered that HA 114 moves back home. In the event 1060, transition is started from the "away" state 1020 to the "at home" state 1000, which consists of Steps 1062 and 1066. In Step 1062, HA 114 notifies to HA 112 that it has returned from home and has no need to be a proxy any more. In Step 1066, HA 114 removes the "away" flag 543.

In this case, if MR 124 and HA 114 are actually a single entity, HA 114 must send BU to its home agent (i.e. HA 112) when it is in the "away" state. In addition, as already explained, HA 114 can easily decide whether it is "away" from home or it is positioned "at home" without requiring a special signaling mechanism. Preferably, HA 114 may always assume that its home agent is a fixed home agent, to which the functions as the home agent are to be delegated. On the other hand, even in case a mobile or a fixed home agent is hierarchically disposed, it is apparent that the effects of the present invention can be obtained when a certain home agent delegates the home agent functions to any home agent positioned on upper layer even in case a mobile or a fixed home agent is hierarchically disposed. In this case, it is desirable that the home agent functions are delegated to a fixed home agent.

On the preferred first and second embodiment as described above, an apparatus, a method, and a system to support the mobile home agent are disclosed. The mobile home agent may be provided under various situations in a group, which has hierarchical organization such as a corporate network, an emergency response team, etc., or it is not limited to these. As the corporate network, total network may be extended to a totally global corporate—in particular, to a multinational corporate. It may also be so arranged that the fixed home agent (i.e. HA 112) at the top of the corporate network supports various mobile segments of the corporate. The mobile segment may be "section" or "department" in offices of regional area. Each mobile segment must have its own home agent (i.e. HA 114) because individual staff in charge (MN 130) is mobile.

As the emergency response team, e.g. a fire department, a local fire department may have a fixed home agent (HA 112) as host. In each of local areas, there may be many department staffs (fire fighters, firemen) for each fire engine. If each fire engine has a home agent (HA 114), each fireman (MN 130) can be connected to the network when they move for carrying out the rescue operation. As an example when the organization is applied to a hierarchical group, one major home agent (HA 112) is assigned to infantry division headquarters, and one mobile home agent (HA 114) may be assigned to each infantry battalion. These mobile home agents are used to support each company, platoon, or squad.

As it is evident from the examples as given above, there can be a plurality of levels in home agent hierarchy. In the preferred embodiments as described above, description has been given on only one fixed home agent and on only one mobile home agent for convenience, while it would be apparent to those skilled in the art that it is to simplify the explanation, and not to limit the invention. Also, those skilled in the art would easily understand that the home agent of the mobile network including mobile home agent may be a mobile home agent in itself.

When description is given on an example, which is hierarchized in multiple layers and each hierarchical layer is applied, it is applied to a group where each of the hierarchical layers moves. Only the home agent in the division headquarters may be a fixed home agent. In this case, the home agent of infantry battalion is a mobile home agent, and it manages and controls a plurality of mobile networks on company level. Each mobile network of company level comprises one mobile agent, and this mobile home agent manages and controls over a plurality of mobile networks on platoon level. The mobile network of each platoon level comprises one mobile home agent, and this mobile home agent manages and controls over a plurality of the mobile network on squad level. The mobile network of each platoon level comprises a plurality of mobile nodes, and each soldier belongs to this mobile node. In this case, therefore, total network of the division make up a hierarchy, which has a plurality of mobile home agents of each class.

In case there are mobile home agents of a plurality of classes, other examples of application can be conceived within the scope of the present invention. For instance, a mobile home agent on lower class may delegate functions of home agent and binding cache entry to the home agent (may be mobile home agent) on the next upper class. When this home agent of the next upper class is not within the home, home agent functions and binding cache entry are delegated to the other home agents (including those delegated by the mobile home agent of lower classes). For instance, a mobile home agent of platoon level delegates its home agent functions to the mobile home agent of company level. This mobile home agent of company level delegates its own home agent functions and the home agent functions as delegated from the mobile home agent of platoon level to the mobile home agent of battalion level when it leaves the home.

As another application example, a case can be conceived where each mobile home agent delegates its home agent functions and binding cache entry to the home agent of the uppermost level regardless of how far the levels of two home agents are separated from each other. For instance, a home agent of platoon level may delegate its home agent functions directly to the home agent of division level by skipping over the home agents of company level and battalion level.

Those skilled in the art would easily understand that HA 114 has no need to physically move although it is described as "mobile home agent" in the embodiments given above. The term "mobile" relates to a path from the mobile node, which receives packet from home domain and to which services are offered by HA 114. As far as the position of HA 114 is changed in relation to this path, HA 114 is "mobile" and the present invention can be applied. A rather interesting application example is given in FIG. 12.

Figure 12:
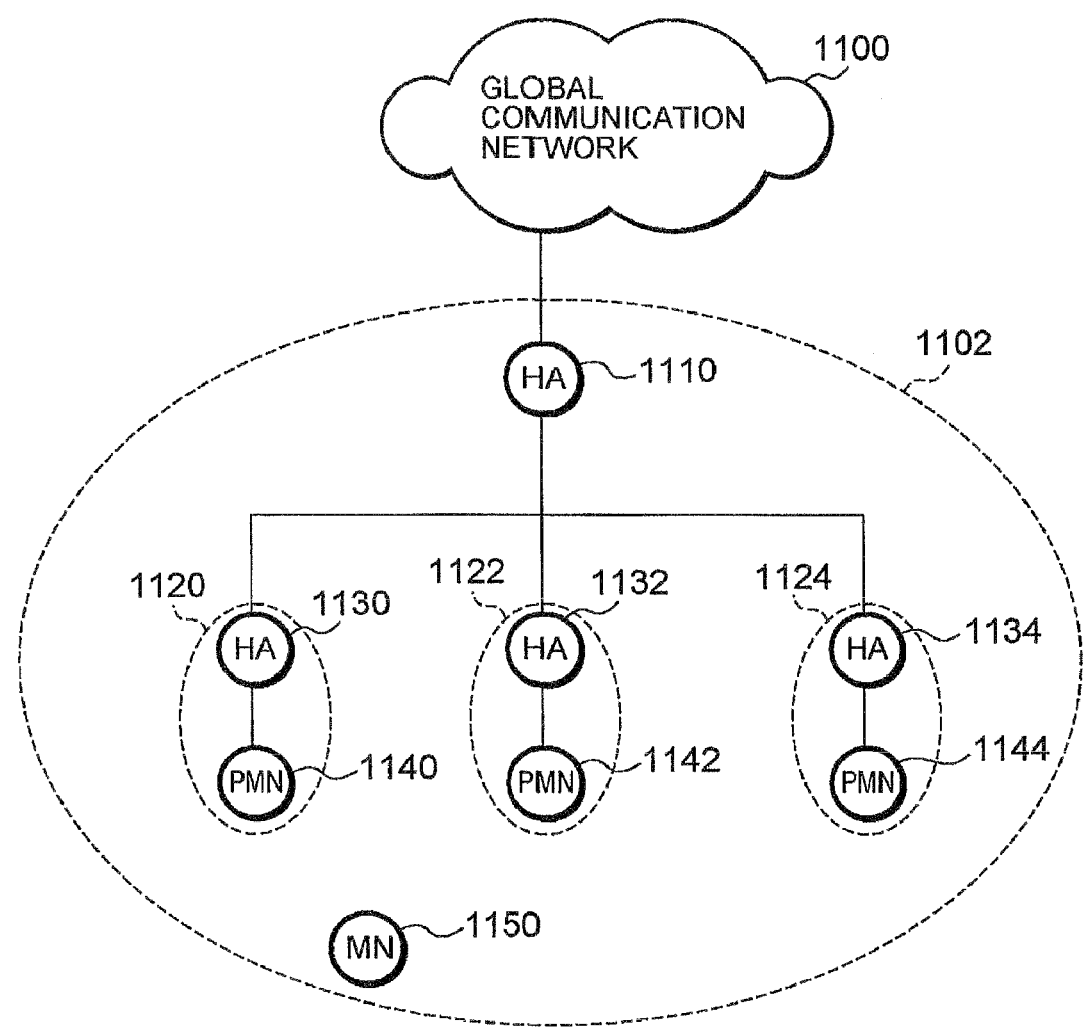
FIG. 12 is a drawing to explain an arrangement example in case the present invention is applied to a local mobility management system.

In FIG. 12, an access network domain 1102 is connected to a global communication network 1100 such as Internet. In the access network domain 1102, there are arranged HA 1110, which is a home agent of the uppermost level and a plurality of access routers 1120, 1122 and 1124 of lower level so that a mobile node (MN) 1150 can have access to the global communication network 1100. The present invention can be applied to the access network domain 1102 so that MN 1150, which is roaming in the access network domain 1102, has no need to change its address regardless of the number of access routers 1120, 1122, and 1124, which are being switched in the access network domain 1102. This is known as "local mobility management".

Description will be given below on a preferred method to attain this purpose. Each of the access routers 1120, 1122 and 1124 comprises home agent elements (HA) 1130, 1132 and 1134 and proxy mobile node elements (PMN) 1140, 1142 and 1144. Each of the home agent elements (HA) 1130, 1132 and 1134 fulfills the functions of the mobile home agent 114 as described in the present invention. Each of the proxy mobile node elements (PMN) 1140, 1142 and 1144 acts as a proxy of each MN 1150, which is currently connected to the access routers 1120, 1122 and 1124 respectively for each MN 1150. First, when entry of MN 1150 is made to the access network domain 1102, home address and access router connected first (here, it is to be AR 1120) are assigned. Therefore, HA 1130 is assigned to MN 1150. The assignment of the home addresses and the home agents are handled by PMN 1140, and this is transmissive to MN 1150.

When MN 1150 moves to another access router (here, it is to be AR 1122), the moving source HA 1130 detects as "moved" with regard to MN 1150, and the home agent functions to MN 1150 are delegated to HA 1110 of the uppermost level. The moving source HA 1130 executes neighbor discovery proxy to MN 1150 so that the packet to MN 1150 as received by the moving source AR 1120 is intercepted by the moving source HA 1130 and is transferred to HA 1110 of the uppermost level. After a while, the moving destination PMN 1142 detects MN 1150 connected to the moving destination AR 1122. The care of address of MN 1150 is built up, and a binding update message for MN 1150 is transmitted to the moving source HA 1130. However, the home agent functions of HA 1110 uppermost level are currently delegated and the binding update message is intercepted. In this way, the packet delivered to the home address (home address as assigned first by the moving source PMN 1140) is delivered to MN 1150 even when MN 1150 is newly connected to the moving destination AR 1122. This "local mobility management" can be accomplished by applying the present invention even when MN 1150 does not become aware of it.

In the above, description has been given on the present invention by taking examples on the most practical and preferable embodiments. Those skilled in the art would easily understand that various changes and modifications can be made on the arrangement and the parameters without departing from the scope of the present invention. For instance, as special notice is given in the preferred embodiments as given above, the mobile home agent may be a mobile router in itself (i.e. MR 124 and HA 114 may be the same entity). Further, the mobile nodes, e.g. MN 130 and MN 134, may be mobile routers. Actually, they are considered to be mobile home agents.

Each of the functional blocks used in the above description on the embodiments of the invention is realized as LSI (Large Scale Integration), which is typically an integrated circuit. These may be produced individually in one chip or may be produced in a single chip to include a part or all. Here, it is referred as LSI, while it may be called IC (Integrated Circuit), system LSI, super LSI or ultra LSI, depending on the difference in integration. Also, the method to manufacture the integrated circuit is not limited to LSI, and it may be manufactured as a special-purpose circuit or a general-purpose processor. Also, after the manufacture of LSI, FPGA (Field Programmable Gate Array), which can be programmed, or reconfigurable processor, in which connection or setting of circuit cells inside LSI can be reconfigured, may be used. Further, with the progress of semiconductor technique or with the emergence of new technique derived from it, if a technique of circuit integration may appear, which can replace LSI, the functional blocks may be integrated by using such technique. For example, the adaptation of biotechnology is one of such possibilities.

INDUSTRIAL APPLICABILITY

The present invention provides such effects that unnecessary routing in the communication between a mobile node and a correspondent node can be reduced in case a home agent of a mobile node is a mobile home agent, and this can be used in such field as "local mobility management" domain.

The invention claimed is:

1. A communication system, comprising a first home agent positioned in a home domain and a second home agent of a mobile node, said second home agent being a mobile home agent, and a mobile network of said mobile home agent is hierarchized under said home domain, wherein said mobile home agent comprises:
a detecting section that detects whether or not the mobile home agent itself is away from said home domain;
a discovering section that discovers said first home agent in case it is detected that the mobile home agent is away from said home domain; and
a delegating section that delegates binding cache entry of said mobile node under management to said first home agent so that said first home agent acts as a home agent for said mobile node.

2. The communication system according to claim 1, wherein said mobile home agent further comprises:
an execution section that continues execution of neighbor discovery proxy of said mobile node after said binding cache entry of said mobile node is delegated to said first home agent, and intercepts a packet addressed to said mobile node and transferring said packet to said first home agent.

3. The communication system according to claim 1, wherein said mobile home agent further comprises:
a detecting section that detects that said mobile home agent itself has returned to said home domain, and collects said binding cache entry delegated to said first home agent.

4. The communication system according to claim 1, wherein said mobile home agent further comprises:
a detecting section that detects that said mobile node away from home of said mobile home agent has returned to its own home during the time when the mobile home agent itself is not within the home domain, and notifies said first home agent that said binding cache entry of the mobile node should be deleted.

5. The communication system according to claim 1, wherein:
for the purpose of transmissively carrying out the delegation of said binding cache entry to said mobile node:
said binding cache entry is transferred to said first home agent from said mobile home agent, and said first home agent maintains said binding cache entry transferred by said first home agent; and
said first home agent acts as a proxy home agent of said mobile node of said binding cache entry maintained by said first home agent, said first home agent intercepts a packet addressed to said mobile node and turns the packet to tunnel by using source address of the tunnel packet as address of said mobile home agent.

6. The communication system according to claim 1, wherein:
for the purpose of non-transmissively carrying out the delegation of said binding cache entry to said mobile node:
said mobile home agent transmits a binding cache entry delegation message including a security token newly generated to said first home agent and notifies said first home agent to said mobile node; and
upon receipt of notification of said first home agent, said mobile node transmits a new binding cache update message to said first home agent.

7. A mobile home agent in a communication system, which comprises a first home agent positioned in a home domain and a second home agent of a mobile node, said second home agent being a mobile home agent, and a mobile network of said mobile home agent is hierarchized under said home domain, wherein said mobile home agent comprises:
a detecting section that detects whether or not the mobile home agent itself is away from said home domain;
a discovering section that discovers said first home agent when it is detected that the first home agent is away from said home domain; and
a delegating section that delegates binding cache entry of said mobile node under the management of said first home agent to said first home agent so that said first home agent acts as a home agent for said mobile node.

8. The mobile home agent according to claim 7, wherein said mobile home agent further comprises an execution section that continues execution of neighbor discovery proxy of said mobile node after delegating the binding cache entry of said mobile node to said first home agent, and intercepts a packet addressed to said mobile node and transferring said packet to said first home agent.

9. The mobile home agent according to claim 7, wherein said mobile home agent further comprises a detecting section that detects that said mobile node has returned to said home domain, and collects binding cache entry delegated to said first home agent.

10. The mobile home agent according to claim 7, wherein said mobile home agent further comprises a detecting section that detects that said mobile node has returned to its own home, from which it has been away during the period when it is not positioned in said home domain, and notifies said first home agent that binding cache entry of said mobile node should be deleted.

* * * * *

UNITED STATES PATENT AND TRADEMARK OFFICE
CERTIFICATE OF CORRECTION

| | | |
|---|---|---|
| PATENT NO. | : 8,098,642 B2 | Page 1 of 1 |
| APPLICATION NO. | : 12/306906 | |
| DATED | : January 17, 2012 | |
| INVENTOR(S) | : Jun Hirano et al. | |

It is certified that error appears in the above-identified patent and that said Letters Patent is hereby corrected as shown below:

Item 56, References Cited, Other Publications, page 2, right column, line 4, in the Letters Patent issued on January 17, 2012, incorrectly reads:

"P. Thubert, er al., "Global HA to HA protocol," draft-thubert-nemo-"

and should read:

"P. Thubert, et al., "Global HA to HA protocol," draft-thubert-nemo-"

Signed and Sealed this
Fifteenth Day of May, 2012

David J. Kappos
*Director of the United States Patent and Trademark Office*